(12) United States Patent
Johnston et al.

(10) Patent No.: US 11,338,647 B1
(45) Date of Patent: May 24, 2022

(54) VEHICLE THERMAL SYSTEM

(71) Applicants: Vincent G. Johnston, Half Moon Bay, CA (US); Damjan Puljic, Sunnyvale, CA (US); Kegan J. Connick, San Jose, CA (US); Anup M. Vader, San Jose, CA (US)

(72) Inventors: Vincent G. Johnston, Half Moon Bay, CA (US); Damjan Puljic, Sunnyvale, CA (US); Kegan J. Connick, San Jose, CA (US); Anup M. Vader, San Jose, CA (US)

(73) Assignee: Apple Inc., Cupertino, CA (US)

( * ) Notice: Subject to any disclaimer, the term of this patent is extended or adjusted under 35 U.S.C. 154(b) by 418 days.

(21) Appl. No.: 16/523,582

(22) Filed: Jul. 26, 2019

Related U.S. Application Data

(60) Provisional application No. 62/779,734, filed on Dec. 14, 2018, provisional application No. 62/723,048, filed on Aug. 27, 2018.

(51) Int. Cl.
*B60H 1/32* (2006.01)
*B60H 1/00* (2006.01)
*B60H 1/14* (2006.01)

(52) U.S. Cl.
CPC ..... *B60H 1/32011* (2019.05); *B60H 1/00328* (2013.01); *B60H 1/00485* (2013.01); *B60H 1/143* (2013.01); *B60H 1/32284* (2019.05); *B60H 2001/00307* (2013.01)

(58) Field of Classification Search
CPC ................ B60H 1/143; B60H 1/32284; B60H 2001/00307; B60H 1/32014
See application file for complete search history.

(56) References Cited

U.S. PATENT DOCUMENTS

| 8,336,319 | B2 | 12/2012 | Johnston et al. | |
|---|---|---|---|---|
| 8,402,776 | B2 * | 3/2013 | Johnston | B60L 58/27 62/79 |
| 9,758,011 | B2 | 9/2017 | Johnston | |
| 9,758,012 | B2 | 9/2017 | Johnston | |
| 9,819,063 | B2 | 11/2017 | Blatchley et al. | |
| 9,844,995 | B2 | 12/2017 | Rawlinson | |
| 2013/0074525 | A1 | 3/2013 | Johnston et al. | |
| 2013/0298583 | A1 | 11/2013 | O'Donnell et al. | |

(Continued)

*Primary Examiner* — Lionel Nouketcha
(74) *Attorney, Agent, or Firm* — Young Basile Hanlon & MacFarlane, P.C.

(57) ABSTRACT

A vehicle thermal system includes a heat-generating component, a heat-absorbing component, a liquid coolant reservoir for receiving and distributing a liquid coolant, a first liquid loop that is connected to the liquid coolant reservoir, includes a first pump upstream from a first functional component to circulate the liquid coolant, is heated by the heat-generating component, and includes a first valve downstream from the first functional component to control recirculation or return of the liquid coolant to the liquid coolant reservoir, and a second liquid loop that is connected to the liquid coolant reservoir, includes a second pump upstream from a second functional component to circulate the liquid coolant, is cooled by the heat-absorbing component, and includes a second valve downstream from the second functional component to control recirculation or return of the liquid coolant to the liquid coolant reservoir.

24 Claims, 9 Drawing Sheets

(56) References Cited

U.S. PATENT DOCUMENTS

| | | |
|---|---|---|
| 2014/0216709 A1 | 8/2014 | Smith et al. |
| 2016/0107501 A1 | 4/2016 | Johnston |
| 2016/0107502 A1 | 4/2016 | Johnston |
| 2016/0107503 A1 | 4/2016 | Johnston |
| 2016/0107504 A1 | 4/2016 | Johnston |
| 2016/0107505 A1 | 4/2016 | Johnston |
| 2016/0107508 A1 | 4/2016 | Johnston |
| 2016/0153343 A1 | 6/2016 | Kakehashi et al. |
| 2016/0318409 A1 | 11/2016 | Rawlinson |
| 2016/0332505 A1 | 11/2016 | Yamanaka et al. |
| 2019/0118610 A1* | 4/2019 | Johnston ............ B60H 1/00899 |

* cited by examiner

VEHICLE THERMAL SYSTEM

CROSS-REFERENCE TO RELATED APPLICATIONS

This application claims the benefit of U.S. Provisional Application No. 62/723,048 filed on Aug. 27, 2018 and U.S. Provisional Application No. 62/779,734 filed on Dec. 14, 2018, the contents of which are hereby incorporated by reference herein in their entireties for all purposes.

FIELD

The present disclosure relates generally to thermal systems for vehicles.

BACKGROUND

Vehicles may include multiple subsystems that generate waste heat while performing a function that is related to operation of the vehicle. Examples of heat-generating components that may be included in vehicle subsystems include drive motors, inverters, batteries, sensors, computers, and compressors. If the waste heat is not removed from these systems, they may overheat and/or fail prematurely. The heating and cooling requirements for certain subsystems may vary dependent upon environmental conditions or other factors. In some situations, these subsystems may benefit from added heat, such as during cold-weather conditions. In addition, passenger compartments and other occupied spaces also benefit from thermal management to improve comfort during hot, humid, and cold conditions.

SUMMARY

One aspect of the disclosure is a vehicle thermal system that includes a heat-generating component, a heat-absorbing component, a liquid coolant reservoir, a first liquid loop, and a second liquid loop. The liquid coolant reservoir receives and distributes a liquid coolant. The first liquid loop is connected to the liquid coolant reservoir, includes a first pump that is upstream from a first functional component to circulate the liquid coolant to the first functional component, is heated by the heat-generating component, and includes a first valve downstream from the first functional component to control recirculation of the liquid coolant or return of the liquid coolant to the liquid coolant reservoir. The second liquid loop is connected to the liquid coolant reservoir, includes a second pump that is upstream from a second functional component to circulate the liquid coolant to the second functional component, is cooled by the heat-absorbing component, and includes a second valve downstream from the second functional component to control recirculation of the liquid coolant or return of the liquid coolant to the liquid coolant reservoir.

Another aspect of the disclosure is a vehicle thermal system that includes a refrigeration-cycle thermal system that includes a heat-generating component and a heat-absorbing component, a liquid coolant reservoir that receives and distributes a liquid coolant, a controller that controls distribution of the liquid coolant, a cabin heating loop, and a cabin cooling loop. The cabin heating loop is connected to the liquid coolant reservoir, is heated by the heat-generating component of the refrigeration-cycle thermal system and circulates the liquid coolant to a cabin heating subsystem. The cabin heating loop includes a cabin heating pump to control flow of the liquid coolant in response to commands from the controller, a cabin heating valve to control return of the liquid coolant to the liquid coolant reservoir in response to commands from the controller, and a cabin heating temperature sensor. The cabin cooling loop is connected to the liquid coolant reservoir, is cooled by the heat-absorbing component of the refrigeration-cycle thermal system and circulates the liquid coolant to a cabin cooling subsystem. The cabin cooling loop includes a cabin cooling pump to control flow of the liquid coolant in response to commands from the controller, a cabin cooling valve to control return of the liquid coolant to the liquid coolant reservoir in response to commands from the controller, and a cabin cooling temperature sensor.

Another aspect of the disclosure is a vehicle thermal system that includes a cabin heating loop, a powertrain loop, a combined-flow section, and a valve. The cabin heating loop circulates a liquid coolant to a cabin heating subsystem and is heated by a heat-generating component of a refrigeration-cycle thermal system. The powertrain loop circulates the liquid coolant to a powertrain subsystem. The combined-flow section that mixes the liquid coolant from the cabin heating loop with a portion of the liquid coolant from the powertrain loop. The valve controls flow of the liquid coolant between the powertrain loop and the cabin heating loop.

Another aspect of the disclosure is a vehicle thermal system that includes a refrigeration-cycle thermal system that includes a heat-generating component and a heat-absorbing component, a liquid coolant reservoir that receives and distributes a liquid coolant, and a controller that controls distribution of the liquid coolant. The vehicle thermal system also includes a powertrain and cabin heating loop that is connected to the liquid coolant reservoir, includes a heat-generating component of the refrigeration-cycle thermal system, a powertrain subsystem, a cabin heating subsystem, a first radiator, and a powertrain and cabin heating valve to proportionally control flow of the liquid coolant cabin heating subsystem and the first radiator in response to commands from the controller. The vehicle thermal system also includes a cabin cooling loop that is connected to the liquid coolant reservoir, is cooled by the heat-absorbing component of the refrigeration-cycle thermal system, and circulates the liquid coolant to a cabin cooling subsystem, wherein the cabin cooling loop includes a cabin cooling pump to control flow of the liquid coolant in response to commands from the controller, a cabin cooling valve to control return of the liquid coolant to the liquid coolant reservoir in response to commands from the controller, and a cabin cooling temperature sensor. In some implementations, the vehicle thermal system may also include an electrical loop that is connected to the liquid coolant reservoir and circulates the liquid coolant to an electrical subsystem, and a shared radiator section that includes a second radiator and a radiator valve. The shared radiator valve is connected to the powertrain and cabin heating loop and the electrical loop to control flow of the liquid coolant to the second radiator from the powertrain and cabin heating loop and the electrical loop in response to commands from the controller.

DETAILED DESCRIPTION

Figure 1:
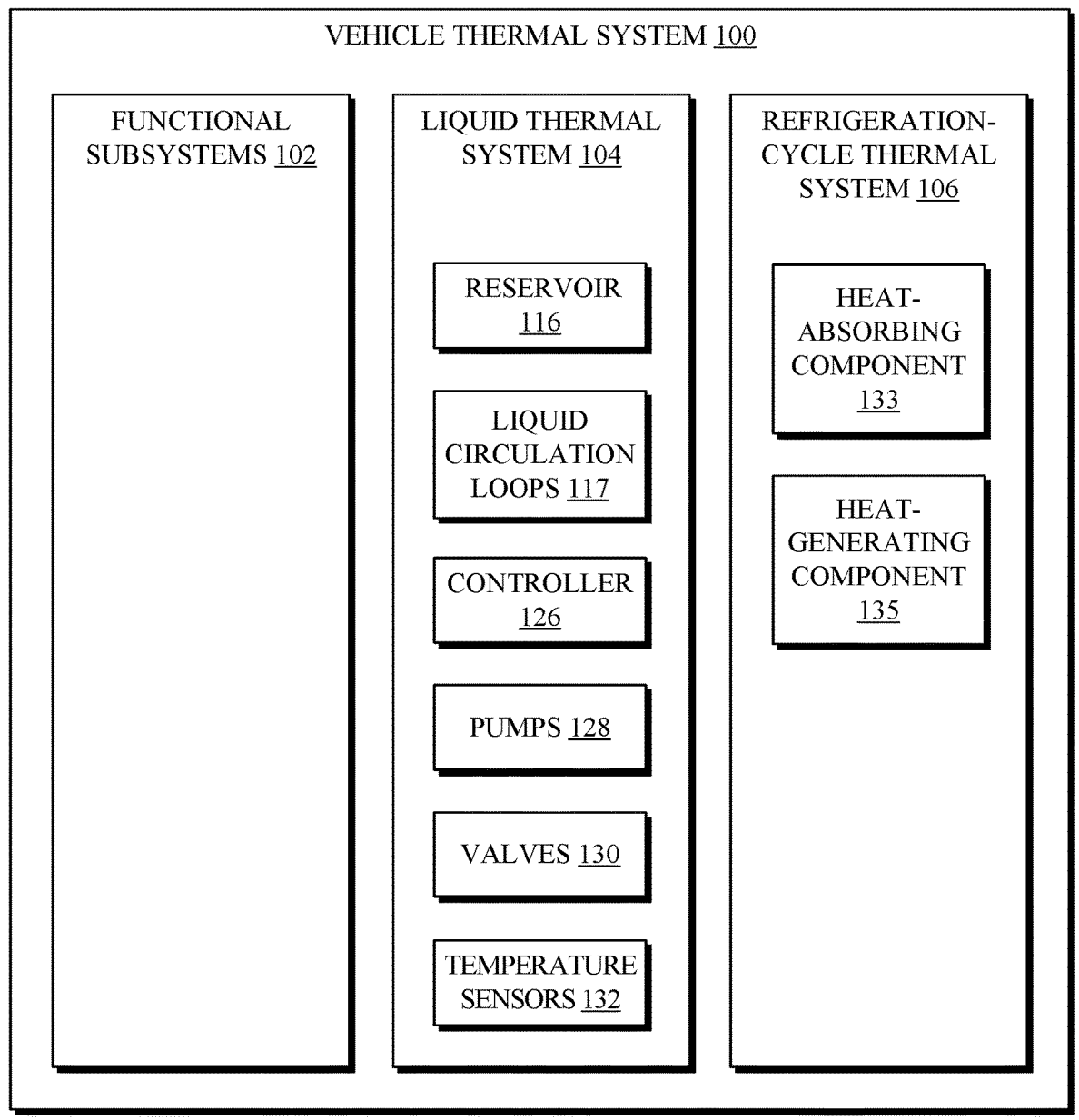
FIG. 1 is a functional block diagram that shows components of a vehicle thermal system according to a first example.

This disclosure is directed to thermal management systems and methods for operating thermal management systems. The thermal management systems described herein are configured to allow independent thermal management and control of a plurality of vehicle subsystems using a common heat and cold generating powerplant using an electric or fuel powered refrigerant cycle, such as a CO2-based R744 refrigerant cycle. In addition, heat management between subsystems is provided through direct mixing of subsystem liquid coolant streams to utilize waste heat from one system to add heat to another system as needed. Direct mixing of liquid coolant streams allows the transfer of waste heat without heat exchanger components between subsystems and offers the best possible theoretical heat transfer exchange between the subsystems. Glycol-water coolant (or another similar type of liquid coolant), is utilized as the primary heat transfer media due to its low freezing point compared to pure water, high heat capacity compared to air, and its ability to be routed to the locations where heat needs to be extracted or applied.

The thermal systems described herein each have a coolant reservoir and multiple coolant loops that each serve one or more subsystems of the vehicle. The subsystems of the vehicle may include, as examples, a powertrain subsystem, an electrical subsystem (e.g., batteries, sensors, and/or computers), a cabin cooling subsystem and cabin heating subsystem. Each subsystem has a dedicated coolant pump that is individually controlled at a variable speed to control of the flow rate of the coolant that is provided to the subsystem, in accordance with the thermal requirements of the subsystem, the temperature at the subsystem, and the temperature of the coolant at the reservoir.

A high bypass degas bottle coolant reservoir is used by the thermal systems described herein for fill, pressure relief, coolant level/leak detection, fluid mixing for temperature control, and for deaerating the coolant. These functions are accomplished using flow control valves that are arranged to allow coolant from each subsystem to flow into the coolant reservoir, and to route coolant between the subsystems. This arrangement allows for precise blending of coolant from multiple subsystems, which allows waste heat to be applied to secondary uses when needed and allows efficient rejection of waste heat to the environment when there is not a secondary use for the waste heat.

As will be described further herein, one aspect of the disclosure is a thermal management system for a vehicle in which using a single powerplant is utilized for both heating and cooling a plurality of subsystems. Another aspect of the disclosure is a thermal management system for a vehicle in which the coolant loops for all subsystems are filled from a common location. Another aspect of the disclosure is a thermal management system for a vehicle in which the coolant loops for all subsystems are deaerated using a common coolant reservoir that incorporates deaeration features. Another aspect of the disclosure is a thermal management system for a vehicle in which an overall coolant level can be detected at a common reservoir to provide a low-level warning indicative of a leak in any one of the subsystems. Another aspect of the disclosure is a thermal system for a vehicle in which heat is directly exchanged between coolant loops for multiple subsystems without heat exchangers, and without pressure or flow imbalances that could result in unwanted heat dissipation to other subsystems, by use of pumps and valves. Another aspect of the disclosure is a control system to effectively manage heating and cooling of multiple of subsystems using a common powerplant and a common coolant reservoir.

FIG. 1 is a functional block diagram that shows components of a vehicle thermal system 100. The systems of the vehicle thermal system 100 include functional subsystems 102, a liquid thermal system 104, and a refrigeration-cycle thermal system 106.

The functional subsystems 102 include groups of thermally-related components of the vehicle thermal system 100 that contribute to aspects of vehicle operation, including motion and climate control functions. Components that are included in the functional subsystems 102 may include powertrain components, electrical components, and climate control components. These examples are not exhaustive, and other types of component could be included in the functional subsystems 102 of the vehicle thermal system 100. Components can be grouped into individual ones of the functional subsystems 102 based on their thermal properties.

The liquid thermal system 104 includes components that are connected to one another by fluid-carrying components to allow circulation of a liquid coolant by fluid communication between the components. In the illustrated example, the liquid thermal system includes a coolant reservoir 116 and liquid circulation loops 117. The coolant reservoir 116 allows for filling, level sensing, deaeration, and mixing of a liquid coolant. The coolant reservoir 116 is connected to the liquid circulation loops 117 to provide the liquid coolant to and receive the liquid coolant from the liquid circulation loops 117. Multiple ones of the liquid circulation loops 117 may be included in the liquid thermal system 104 to service individual ones of the functional subsystems 102, to add heat to or remove heat from components that are included in the functional subsystems.

Operation of the liquid thermal system 104 is regulated by a controller 126 using pumps 128, valves 130, and temperature sensors 132. The controller 126 may be a conventional computing device that has a memory and a processor and is operable to execute computer interpretable instructions that cause it to perform operations that regulate control of the liquid thermal system 104. The pumps 128 may be variable flow rate pumps of any suitable type that may be controlled by the controller 126, and the pumps 128 may each be associated with a respective one of the liquid circulation loops 117. The valves 130 may be proportional valves of any suitable type that can be utilized to direct a desired amount of the liquid coolant from respective ones of the functional subsystems 102 to the coolant reservoir 116 or to recirculate the liquid coolant within respective ones of the functional subsystems 102 to control temperatures and flow rates for each of the functional subsystems 102. For example, based on signals representing measured temperatures that are received by the controller 126 from the temperature sensors 132, the controller 126 can determine flow rates for each of the pumps 128 and positions for each of the valves 130 to achieve desired temperatures for various portions of the liquid thermal system 104.

As an example, individual ones of the liquid circulation loops 117 may be associated with respective ones of the temperature sensors 132. The temperature sensors 132 are operable to output signals that represent the temperature of the liquid coolant at a location along each of the liquid circulation loops 117. The signals that are output by the temperature sensors 132 are used by the controller 126 to determine how to regulate flow of coolant to and from each of the functional subsystems 102, for example, by diverting waste heat from a first subsystem from the functional subsystems 102 by directing coolant from it to the coolant reservoir 116 and utilizing that waste heat to supply heat to a second subsystem from the functional subsystems 102 where the heat is needed. This type of control may be accomplished, for example, by providing desired temperature ranges for each of the functional subsystems 102 to the controller 126, which utilizes control logic to determine valve positions and pump flow rates to obtain temperatures that are within the desired ranges for each of the functional subsystems 102.

The refrigeration-cycle thermal system 106 is a common heat and cold generating powerplant that uses an electric powered refrigerant cycle (e.g., a vapor-compression refrigeration cycle). As an example, the refrigeration-cycle thermal system 106 may operate using a $CO_2$-based R744 refrigerant cycle. Other suitable refrigerants and cycles may be used.

In the illustrated implementation, the refrigeration-cycle thermal system 106 includes a heat-absorbing component 133 and a heat-generating component 135. The heat-absorbing component 133 is a low-temperature component that is able to absorb heat from other components and thereby lower the temperatures of other components. The heat-generating component 135 is a high-temperature component that is able to supply heat to other components and thereby raise the temperatures of other components. The heat-absorbing component 133 and the heat-generating component 135 may be in thermal communication with the liquid circulation loops to absorb heat from or supply heat to the functional subsystems 102.

Figure 2:
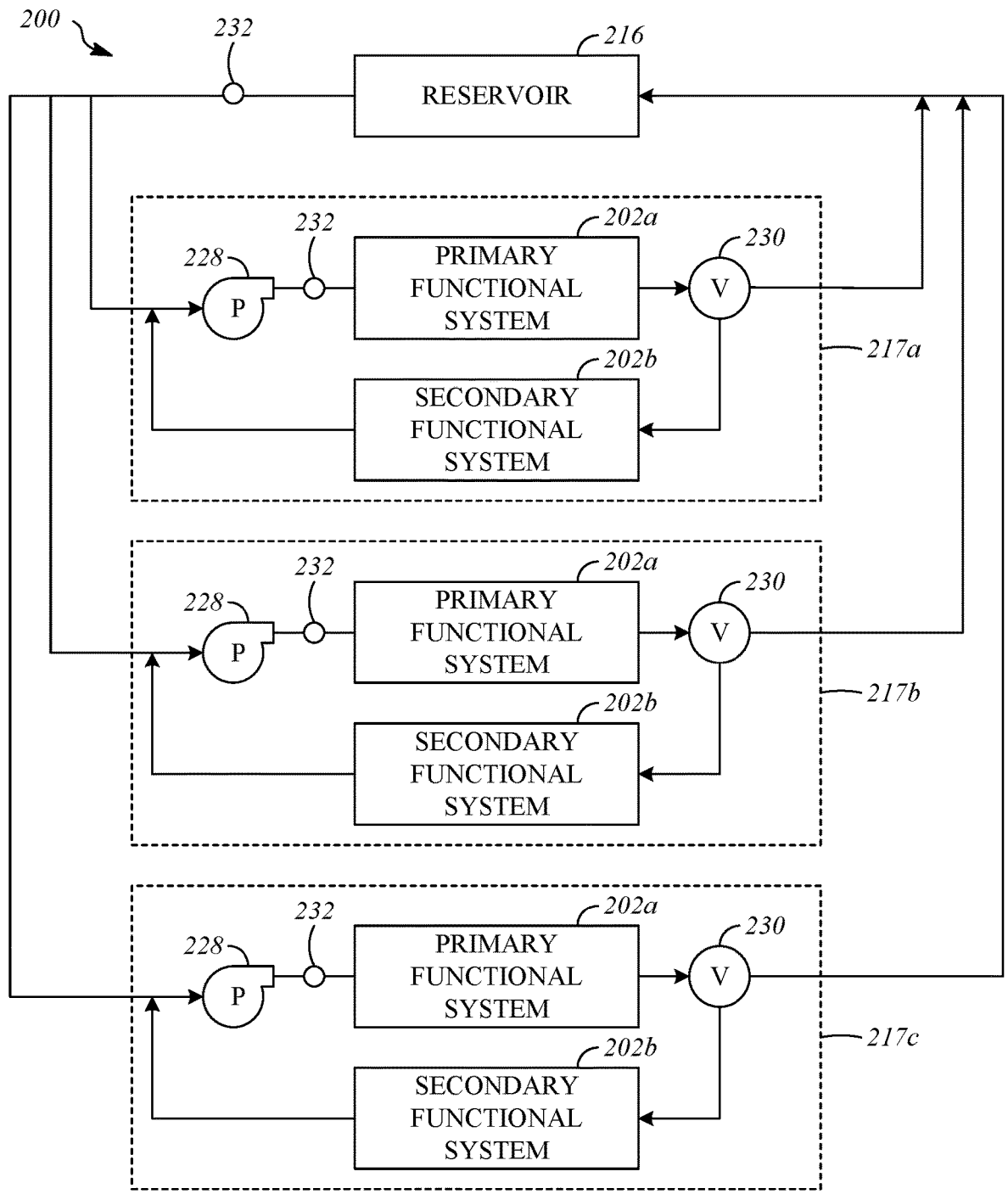
FIG. 2 is an illustration that shows components of a vehicle thermal system according to a second example and fluid flow connections between the components.

FIG. 2 is an illustration that shows components of a vehicle thermal system 200 and fluid flow connections between the components. Components of the vehicle thermal system 200 may be implemented in the manner described with respect to the vehicle thermal system 100, and the description of the vehicle thermal system 100 is incorporated by reference in the description of the vehicle thermal system 200.

The vehicle thermal system 200 regulates temperatures for multiple functional subsystems that are serviced by and incorporated in respective liquid circulation loops. Any number of functional subsystems and liquid circulation loops could be included in the vehicle thermal system 200. In the illustrated example, the vehicle thermal system includes a first liquid circulation loop 217a, a second liquid circulation loop 217b, and a third liquid circulation loop 217c, each of which is configured to receive a supply of a liquid coolant from a coolant reservoir 216 and to return the liquid coolant to the coolant reservoir 216.

The first through third liquid circulation loops 217a-217c may each include a primary functional system 202a, a secondary functional system 202b, a pump 228, and a valve 230. The first through third liquid circulation loops 217a-217c and the coolant reservoir 216 may each include a temperature sensor 232. The temperature sensor 232 for the reservoir 216 may be located downstream from the coolant reservoir 216. Liquid coolant is supplied to each of the first through third liquid circulation loops 217a-217c from the coolant reservoir 216 by the pump 228 that is associated with the respective liquid circulation loop, at a flow rate determined by a controller (not shown in FIG. 2), which may be determined based on a temperature measurement from a respective one of the temperature sensors 232, and in response to control signals received from the controller in the same manner described with respect to the vehicle thermal system 100.

The liquid coolant in each of the first through third liquid circulation loops 217a-217c is pumped to the primary functional system 202a to heat or cool the primary functional system 202a before reaching the valve 230, which is controllable, either absolutely or proportionally, to return the liquid coolant to the coolant reservoir 216 or to recirculate the liquid coolant along a recirculation path that may be included in some or all of the liquid circulation loops. The flow rate of the liquid coolant from the coolant reservoir 216 is therefore controlled by the flow rate of the pump 228 and the position of the valve 230.

The recirculation path is optional and may be omitted from some liquid circulation loops. A secondary functional system 202b may be located along the recirculation path between the valve 230 and the upstream side of the pump 228. The secondary functional system 202b may be configured to control the temperature of the liquid coolant that is supplied to the primary functional system 202a and may be a heat-absorbing component or a heat-generating component, as described with respect to the vehicle thermal system 100

The configuration of the vehicle thermal system 200 allows control of the temperature of multiple functional systems by using waste heat or excess heat absorption capacity to satisfy operational requirements across the various functional subsystems and liquid circulation loops. In addition, the configuration of the vehicle thermal system 200 allows multiple liquid circulation loops to utilize the coolant reservoir 216 concurrently, while preventing flow reversal, negative pressure, and other types of interference between the liquid circulation loops.

Figure 3:
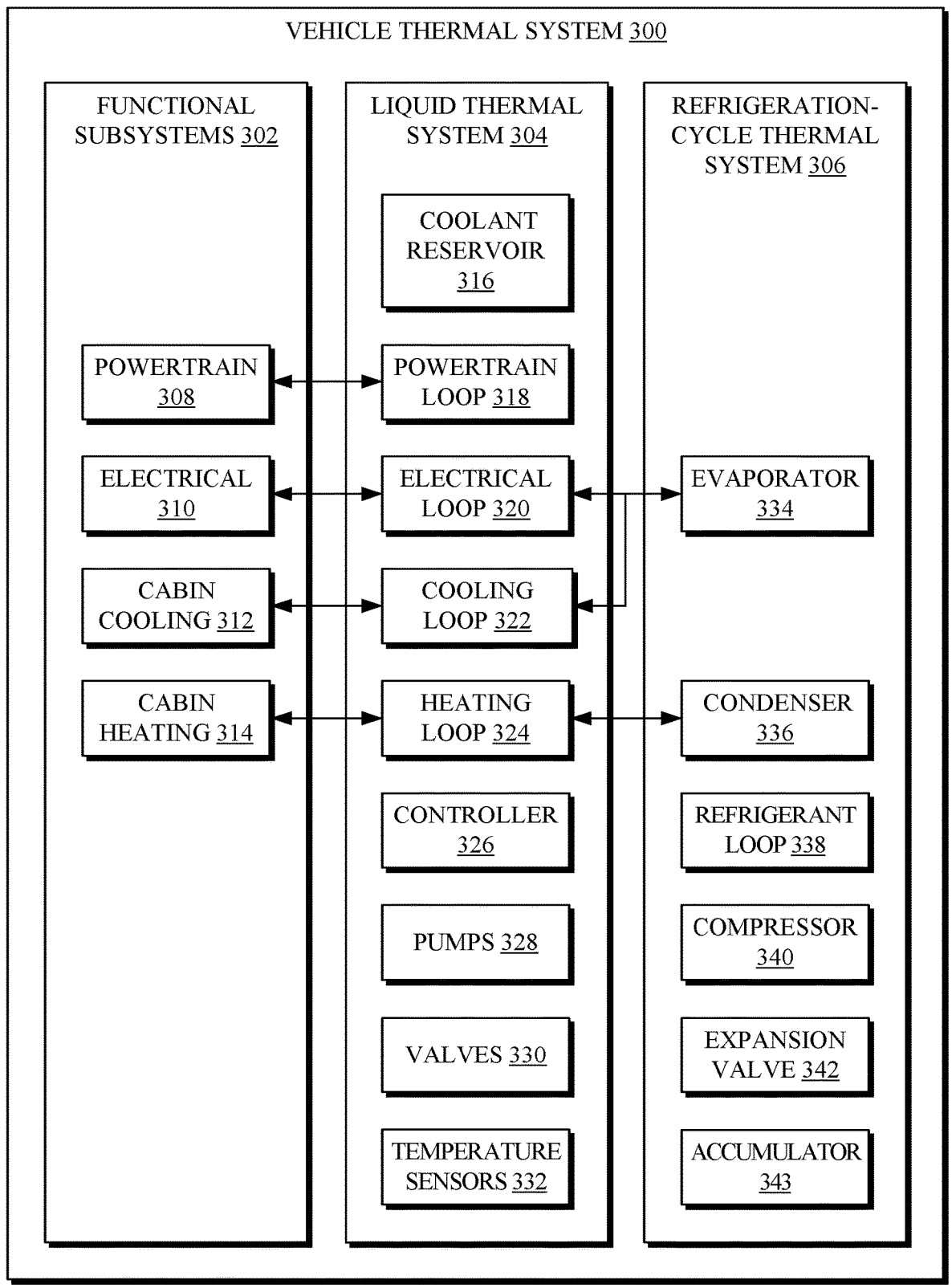
FIG. 3 is a functional block diagram that shows components of a vehicle thermal system according to a third example.

FIG. 3 is a functional block diagram that shows components of a vehicle thermal system 300. The systems of the vehicle thermal system 300 include functional subsystems 302, a liquid thermal system 304, and a refrigeration-cycle thermal system 306.

The functional subsystems 302 include groups of thermally-related components of the vehicle thermal system 300 that contribute to aspects of vehicle operation, including motion and climate control functions. Examples of subsystems that may be included in the functional subsystems 302 include a powertrain subsystem 308 (e.g., electric motors and inverters), an electrical subsystem 310 (e.g., batteries, sensors, and/or computers), a cabin cooling subsystem 312 that is operable to deliver cooled air to a passenger cabin of the vehicle thermal system 300 (e.g., using a blower and a cooling core), and a cabin heating subsystem 314 that is operable to deliver heated air to the passenger cabin of the vehicle thermal system 300 (e.g., using a blower and a heating core). These examples are not exhaustive, and other subsystems could be included in the functional subsystems 302 of the vehicle thermal system 300.

The liquid thermal system 304 includes components that are connected to one another by fluid-carrying components to allow circulation of a liquid coolant by fluid communication between the components. In the illustrated example, the liquid thermal system includes a coolant reservoir 316 and liquid circulation loops. The coolant reservoir 316 allows for filling, level sensing, deaeration, and mixing of a liquid coolant. The coolant reservoir 316 is connected to the liquid circulation loops to provide the liquid coolant to and receive the liquid coolant from the liquid circulation loops. The liquid circulation loops may each correspond to one of the functional subsystems 302 of the vehicle thermal system 300 to add heat to or remove heat from respective ones of the functional subsystems 302. Components may be grouped into the functional subsystems and/or two or more functional subsystems may be served by one of the liquid circulation loops according to thermal requirements. For example, the liquid circulation loops may include a powertrain loop 318 that is configured to add heat to or remove heat from the powertrain subsystem 308, an electrical loop 320 that is configured to add heat to or remove heat from the electrical subsystem 310, a cabin cooling loop 322 that is configured to remove heat from the cabin cooling subsystem 312, and a cabin heating loop 324 that is configured to add heat to the cabin heating subsystem 314. In some implementations, two or more functional subsystems are included in the same liquid circulation loop in liquid thermal system 304, such as by including the powertrain and heating components in the same liquid circulation loop. As will be explained herein, the liquid thermal system 304 is configured to provide flow of liquid coolant at independently controlled temperatures and flow rates to each of multiple coolant-carrying thermal loops, by fluid communication of the liquid coolant between the coolant reservoir 316 and the thermal loops. For example, the liquid thermal system 304 can independently control temperatures and flow rates for the powertrain loop 318, the electrical loop 320, the cabin cooling loop 322, and the cabin heating loop 324 of the liquid thermal system 304.

Operation of the liquid thermal system 304 is regulated by a controller 326 using pumps 328, valves 330, and temperature sensors 332. The controller 326 may be a conventional computing device that has a memory and a processor and is operable to execute computer interpretable instructions that cause it to perform operations that regulate control of the liquid thermal system 304. The pumps 328 may be variable flow rate pumps of any suitable type that may be controlled by the controller 326. A respective one of the pumps 328 may be associated with each of the powertrain loop 318, the electrical loop 320, the cabin cooling loop 322, or the cabin heating loop 324. The valves 330 may be proportional valves of any suitable type that can be utilized to divert a desired amount of the liquid coolant from respective ones of the functional subsystems 302 to the coolant reservoir 316 to control temperatures and flow rates for each of the functional subsystems 302. For example, based on signals representing measured temperatures that are received by the controller 326 from the temperature sensors 332, the controller 326 can determine flow rates for each of the pumps 328 and positions for each of the valves 330 to achieve desired temperatures and flow rates for various portions of the liquid thermal system 304.

As an example, each of the powertrain loop 318, the electrical loop 320, the cabin cooling loop 322, and the cabin heating loop 324 may be associated with respective ones of the temperature sensors 332. The temperature sensors 332 are operable to output signals that represent the temperature of the liquid coolant at a location along each of the powertrain loop 318, the electrical loop 320, the cabin cooling loop 322, and the cabin heating loop 324. The signals that are output by the temperature sensors 332 are used by the controller 326 to determine how to regulate flow of coolant to and from each of the functional subsystems 302, for example, by diverting waste heat from a first subsystem from the functional subsystems 302 by directing coolant from it to the coolant reservoir 316 and utilizing that waste heat to supply heat to a second subsystem from the functional subsystems 302, where the heat is needed. This type of control may be accomplished, for example, by providing desired temperature ranges for each of the functional subsystems 302 to the controller 326, which utilizes control logic to determine valve positions and pump flow rates to obtain temperatures that are within the desired ranges for each of the functional subsystems 302.

The refrigeration-cycle thermal system 306 is a common heat and cold generating powerplant that uses an electric powered refrigerant cycle (e.g., a vapor-compression refrigeration cycle). As an example, the refrigeration-cycle thermal system 306 may operate using a $CO_2$-based R744 refrigerant cycle. Other suitable refrigerants and cycles may be used.

In the illustrated implementation, the refrigeration-cycle thermal system 306 includes heat-generating component, such as a compressor 340, a heat-rejecting component, such as a refrigerant condenser 336, to transfer refrigerant heat to other subsystems or the atmosphere, and a heat-absorbing (i.e., cold-generating) component, such as an evaporator 334 (i.e., a liquid-heated evaporator), that are part of a refrigerant loop 338 that circulates a refrigerant between the refrigerant condenser 336 and the evaporator 334. The refrigerant condenser 336 may be, as examples, a liquid-cooled condenser, or a liquid-cooled gas cooler, which is a high-pressure refrigerant to coolant heat exchanger.

The refrigeration-cycle thermal system 306 also includes other conventional components that are used to implement an electric-powered refrigerant cycle (e.g., a vapor-compression refrigeration cycle), such as a compressor 340, an expansion valve 342, and an accumulator 343. The refrigeration-cycle thermal system 306 can be utilized to supply heating or cooling to portions of the liquid thermal system 304. As an example, during mild temperature weather conditions, cooling from the evaporator via the cabin cooling loop 322, via operation of the pumps 328 and the valves 330 and fluid mixing through the coolant reservoir 316, can be used for cooling the electrical subsystem 310 and the cabin cooling subsystem 312 to cool and dehumidify cabin air. Simultaneously, through operation of the pumps 328 and the valves 330, and bypassing the coolant reservoir 316, the heat from the refrigerant condenser 336 can be supplied through the cabin heating loop 324, to the cabin heating subsystem 314 to increase the cabin air temperature to a comfortable setting after dehumidification. Fluid within each of the functional subsystems 302 can also be recirculated internally to maintain desired temperatures using the pumps 328 and the valves 330.

Figure 4:
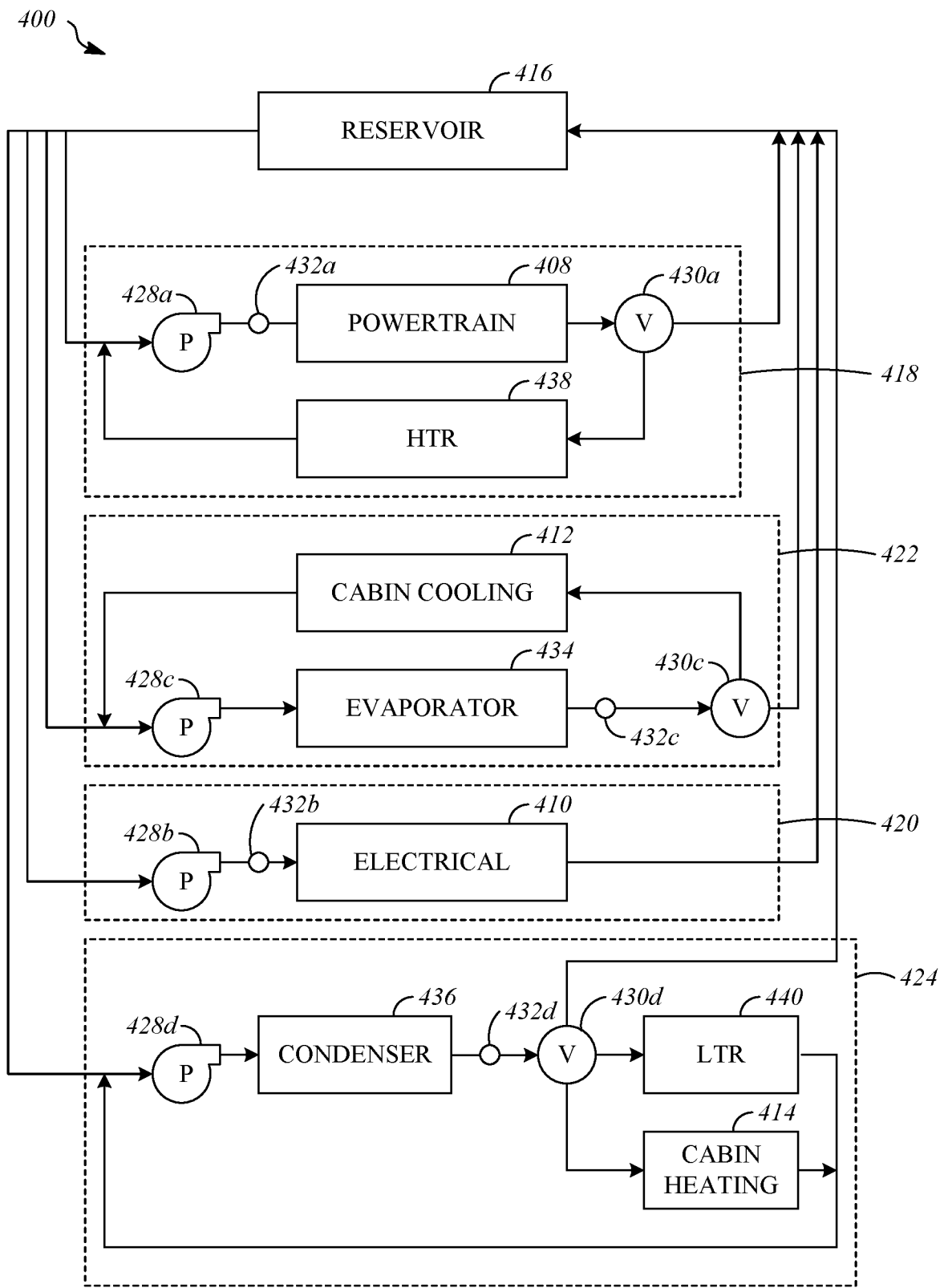
FIG. 4 is an illustration that shows components of a vehicle thermal system according to a fourth example and fluid flow connections between the components.

FIG. 4 is an illustration that shows components of a vehicle thermal system 400 and fluid flow connections between the components. Components of the vehicle thermal system 400 may be similar to the vehicle thermal system 300, like-named components of the vehicle thermal system 400 are identical to corresponding components from the vehicle thermal system 300 except as otherwise described herein, and the descriptions of the corresponding components from the vehicle thermal system 300 are equally applicable except as otherwise described herein.

The vehicle thermal system 400 regulates temperatures for a powertrain subsystem 408, an electrical subsystem 410, a cabin cooling subsystem 412, and a cabin heating subsystem 414, each of which are supplied liquid coolant from and are able to return the liquid coolant to a coolant reservoir 416.

The liquid coolant is circulated to the powertrain subsystem 408 by a powertrain loop 418, which also includes a powertrain pump 428a, a powertrain valve 430a, a powertrain temperature sensor 432a, and a high-temperature radiator 438. The powertrain loop 418 receives the liquid coolant from the coolant reservoir 416 at a flow rate that corresponds to operation of the powertrain pump 428a and the position of the powertrain valve 430a, in response to control signals from a controller (not shown in FIG. 4) in the same manner described with respect to the vehicle thermal system 300.

A portion of the liquid coolant that is circulated through the powertrain subsystem 408 is directed to the high-temperature radiator 438 by the powertrain valve 430a, which is a proportional valve that is controlled to achieve desired temperatures. Fluid that passes through the high-temperature radiator 438 is cooled as waste heat is rejected to an ambient environment (i.e., air around the vehicle) by the high-temperature radiator 438. After passing through the high-temperature radiator 438, this portion of the liquid coolant is delivered to the powertrain pump 428a and then returned to the powertrain subsystem 408.

Fluid that is not directed to the high-temperature radiator 438 by the powertrain valve 430a is directed out of the powertrain loop 418 to the coolant reservoir 416 where it is deaerated and mixed with fluid from other systems. By directing fluid from the powertrain loop 418 to the coolant reservoir 416, heat from the powertrain subsystem 408 can be utilized to increase the temperature of the liquid coolant exiting the coolant reservoir 416 to provide heat to other systems. Alternatively, fluid can be directed from the powertrain loop 418 to the coolant reservoir 416 to utilize excess cooling capacity from other systems to reduce the temperature of the powertrain subsystem 408 if the cooling capacity of the high-temperature radiator 438 is insufficient.

The liquid coolant is circulated to the electrical subsystem 410 by an electrical loop 420, which also includes an electrical pump 428b and an electrical temperature sensor 432b. In the illustrated example, the electrical temperature sensor 432b is located between the electrical pump 428b and the electrical subsystem 410, but it may be located in other locations along the electrical loop 420. In some implementations, certain components, such the electrical temperature sensor 432b, may be internal to the electrical subsystem 410, such temperature monitoring or other types of measurement or control may be performed at specific locations relative to components included in the electrical subsystem 410 (e.g., batteries, sensors, actuators, computer systems, etc.).

The electrical loop 420 receives the liquid coolant from the coolant reservoir 416 at a flow rate that corresponds to operation of the electrical pump 428b, in response to control signals from a controller (not shown in FIG. 4) in the same manner described with respect to the vehicle thermal system 300. Fluid is directed out of the electrical loop 420 to the coolant reservoir 416 where it is deaerated and mixed with fluid from other systems. In the illustrated example, all of the liquid coolant is returned to the coolant reservoir 416 from the electrical loop 420 after passing through the electrical subsystem 410. In the illustrated example, the temperature sensor 432b can be used to measure coolant temperature downstream of the reservoir 416. In alternative implementations, the electrical loop 420 could include a recirculation path that directs a portion of the liquid coolant from the downstream side of the electrical subsystem 410 back to the upstream side of the electrical subsystem 410 (e.g., using a valve) without returning the liquid coolant to the coolant reservoir 416.

Under normal operating conditions, the temperature of the liquid coolant within the electrical loop 420 is maintained such that it is lower than a temperature of the components included in the electrical subsystem 410 and therefore removes heat from the electrical subsystem 410. Under some operating conditions, such as when the electrical subsystem 410 begins operating during cold ambient temperatures, the liquid coolant supplied to the electrical loop 420 may be controlled such that its temperature is higher than that of some or all of the components included in the electrical subsystem 410 to increase the temperature of these components such that they fall within a desired operating temperature range. As one example, the electrical subsystem 410 may include a battery pack that operates inefficiently at low temperatures, and heat may be supplied to the electrical subsystem 410 using the electrical loop 420 to increase the temperature of the battery pack during a cold-start condition.

The liquid coolant is circulated to the cabin cooling subsystem 412 by a cabin cooling loop 422, which also includes a cooling pump 428c, a cooling valve 430c, and a cooling temperature sensor 432c, and is configured to allow heat exchange between the liquid coolant and the evaporator 434. Heat exchange between the liquid coolant and the evaporator 434 lowers the temperature of the liquid coolant relative to the temperature at which the liquid coolant is received at the evaporator 434 to allow cooling of the cabin cooling subsystem 412 and/or of the liquid coolant at the coolant reservoir 416.

The cabin cooling loop 422 receives the liquid coolant from the coolant reservoir 416 at a flow rate that corresponds to operation of the cooling pump 428c and the position of the cooling valve 430c, in response to control signals from a controller (not shown in FIG. 4) in the same manner described with respect to the vehicle thermal system 300. In the illustrated implementation, cooling pump 428c receives the liquid coolant from the coolant reservoir 416 and from the cabin cooling subsystem 412 and pumps the liquid coolant to the evaporator 434. The temperature in the cabin cooling loop 422 is controlled by refrigeration-cycle thermal system 306 via the evaporator 434. Fluid that is directed to the evaporator 434 is cooled by heat exchange with the evaporator 434. The evaporator 434 is a low-temperature component of a refrigeration-cycle system, as previously described with respect to the evaporator 334 of the refrigeration-cycle thermal system 306.

In the illustrated example, the temperature of the liquid coolant is measured by the cooling temperature sensor 432c after leaving the evaporator 434. The liquid coolant is then directed to the cooling valve 430c. The cooling valve 430c is a proportional valve that is controlled to achieve desired flow rate for the cabin cooling subsystem 412 and temperature for other portions of the vehicle thermal system 400 by supplying a portion of the low-temperature liquid coolant from the evaporator 434 to the cabin cooling subsystem 412, and by supplying a portion of the low-temperature liquid coolant to the coolant reservoir 416.

As one example, if low-temperature liquid coolant is not required to lower the temperature at the coolant reservoir 416, the cooling valve 430c may be closed to the coolant reservoir 416 and open to the cabin cooling subsystem 412, which will cause the low-temperature liquid coolant to recirculate between the evaporator 434 and the cabin cooling subsystem 412 under pressure supplied by the cooling pump 428c without receiving liquid coolant from the coolant reservoir 416 and without returning liquid coolant to the coolant reservoir 416. As another example, additional cooling capacity of the evaporator 434 may be required to cool another system, such as the electrical subsystem 410, in which case the cooling valve 430c may be set to direct a first portion of the low-temperature liquid coolant to the cabin cooling subsystem 412 and to direct a second portion of the low-temperature liquid coolant to the coolant reservoir 416 to lower the coolant temperature at the coolant reservoir 416 which allows for supply of that fluid to the electrical subsystem 410 through the electrical loop 420.

The liquid coolant is circulated to the cabin heating subsystem 414 by a cabin heating loop 424, which also includes a heating pump 428d, a heating valve 430d, a heating temperature sensor 432d, and a low-temperature radiator 440. The cabin heating loop 424 is also configured to allow heat exchange between the liquid coolant and the condenser 436. Heat exchange between the liquid coolant and the condenser 436 raises the temperature of the liquid coolant relative to the temperature at which the liquid coolant is received at the condenser 436 to allow heating of the cabin heating subsystem 414 and/or of the liquid coolant at the coolant reservoir 416. The cabin heating loop 424 is also configured to reject waste heat received at the condenser 436 to an ambient environment (i.e., air around the vehicle) by the low-temperature radiator 440 if the waste heat is not required by other subsystem in the vehicle thermal system 400.

The cabin heating loop 424 receives the liquid coolant from the coolant reservoir 416 at a flow rate that corresponds to operation of the heating pump 428d and the position of the heating valve 430d, in response to control signals from a controller (not shown in FIG. 4) in the same manner described with respect to the vehicle thermal system 300. In the illustrated implementation, heating pump 428d receives the liquid coolant from the coolant reservoir 416, the cabin heating subsystem 414, and the low-temperature radiator 440, and pumps the liquid coolant to the condenser 436. Fluid that is directed to the condenser 436 is heated by heat exchange with the condenser 436. The condenser 436 is a high-temperature component of the refrigeration-cycle system. The condenser 436 raises the temperature of the liquid coolant as previously described with respect to the refrigerant condenser 336 of the refrigeration-cycle thermal system 306.

In the illustrated example, the temperature of the liquid coolant is measured by the heating temperature sensor 432d after leaving the condenser 436, but the heating temperature sensor 432d could be located elsewhere. The liquid coolant is then directed to the heating valve 430d. The heating valve 430d is a proportional valve that is controlled to achieve desired temperatures for the cabin heating subsystem 414 and for other portions of the vehicle thermal system 400. The heating valve 430d has three outlets. A first outlet of the heating valve 430d is operable to direct some or all of the high-temperature liquid coolant to the coolant reservoir 416. A second outlet of the heating valve 430d is operable to direct some or all of the high-temperature liquid coolant to the cabin heating subsystem 414. A third outlet of the heating valve 430d is operable to direct some or all of the high-temperature liquid coolant to the low-temperature radiator 440. The high-temperature liquid coolant can be directed to the coolant reservoir 416 by the heating valve 430d to raise the temperature of the liquid coolant that is supplied by the coolant reservoir 416 to the various subsystems of the vehicle thermal system 400. The high-temperature liquid coolant can be directed to the cabin heating subsystem 414 by the heating valve 430d to provide heat to the passenger cabin of the vehicle. The high-temperature liquid coolant can be directed to the low-temperature radiator 440 to allow excess heat from the condenser 436 to be released to the atmosphere. By controlling the heating valve 430d, desired temperatures can be achieved for the cabin heating subsystem 414 and for other subsystems of the vehicle thermal system 400.

As one example, if cabin heating is required and the temperature of the cabin heating subsystem 414 is lower than desired, the heating valve 430d can be controlled to limit or eliminate flow of the high-temperature liquid coolant from the condenser 436 to the coolant reservoir 416 and the low-temperature radiator 440, by instead supplying most or all of the high-temperature liquid coolant to the cabin heating subsystem 414 and recirculating the high-temperature liquid coolant between the condenser 436 and the cabin heating subsystem 414. If cabin heating is not required and heating is not required by other portions of the vehicle thermal system 400, the heating valve 430d can be controlled to direct most or all of the high-temperature liquid coolant to the low-temperature radiator 440. If heating is required by other portions of the vehicle thermal system 400, the heating valve 430d can be controlled to return some or all of the high-temperature liquid coolant from the condenser 436 to the coolant reservoir 416. Since the heating valve 430d is a proportional valve, additional heating scenarios that combine aspects of the control strategies described previously can be accommodated.

Figure 5:
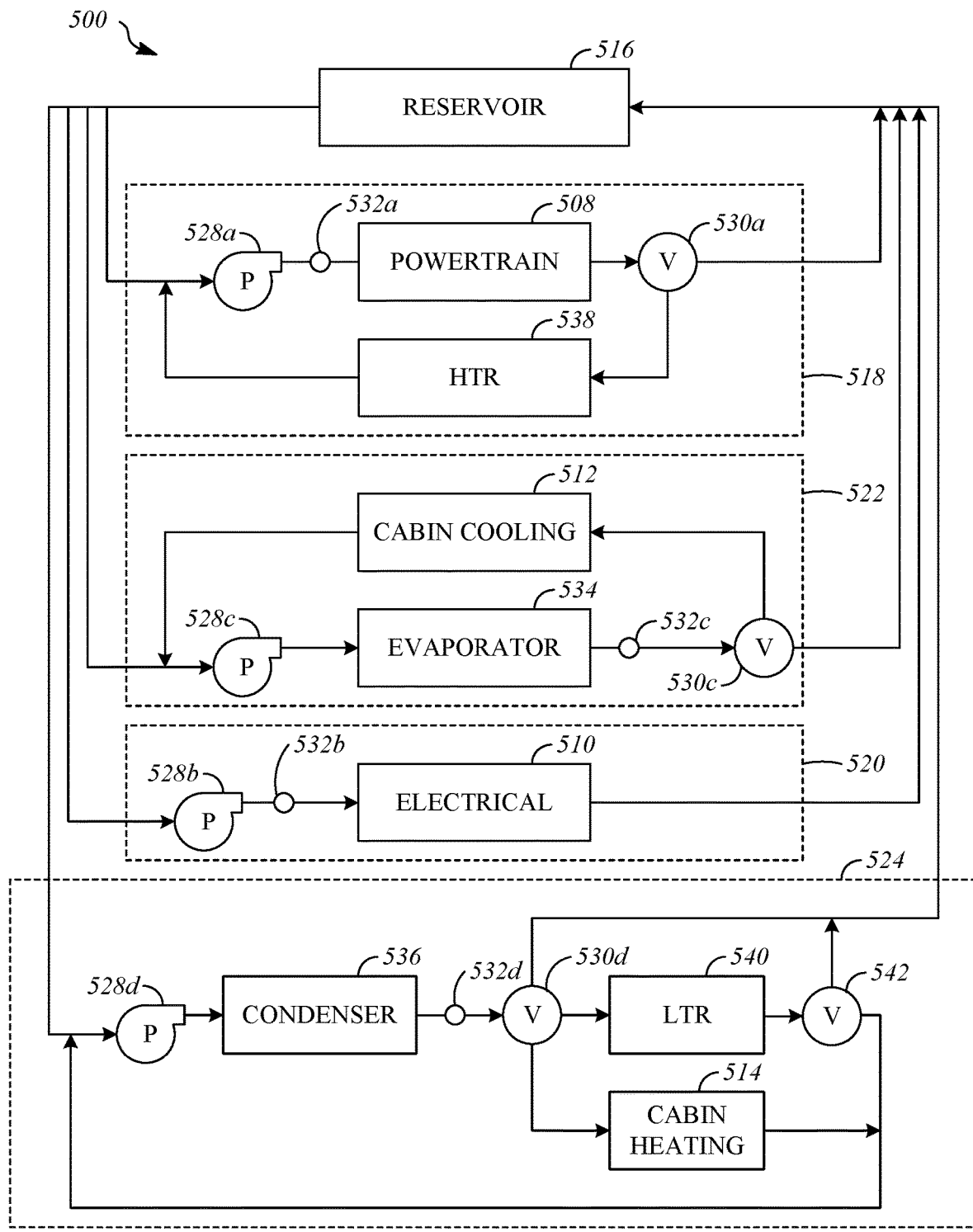
FIG. 5 is an illustration that shows components of a vehicle thermal system according to a fifth example and fluid flow connections between the components.

FIG. 5 is an illustration that shows components of a vehicle thermal system 500 and fluid flow connections between the components. Components of the vehicle thermal system 500 may be similar to the vehicle thermal system 400, and like-named components of the vehicle thermal system 500 are identical to corresponding components from the vehicle thermal system 400. The descriptions of the corresponding components from the vehicle thermal system 300 and the vehicle thermal system 400 are equally applicable, except as otherwise described herein.

The vehicle thermal system 500 regulates temperatures for a powertrain subsystem 508, an electrical subsystem 510, a cabin cooling subsystem 512, and a cabin heating subsystem 514, each of which are supplied liquid coolant from and are able to return the liquid coolant to a coolant reservoir 516.

The liquid coolant is circulated to the powertrain subsystem 508 by a powertrain loop 518, which also includes a powertrain pump 528a, a powertrain valve 530a, a powertrain temperature sensor 532a, and a high-temperature radiator 538. The configuration and operation of the powertrain subsystem 508 is as described with respect to the powertrain subsystem 408.

The liquid coolant is circulated to the electrical subsystem 510 by an electrical loop 520, which also includes an electrical pump 528*b* and an electrical temperature sensor 532*b*. In the illustrated example, the electrical temperature sensor 532*b* is located between the electrical pump 528*b* and the electrical subsystem 510, but it may be located in other locations along the electrical loop 520. In some implementations, certain components, such the electrical temperature sensor 532*b*, may be internal to the electrical subsystem 510, such temperature monitoring or other types of measurement or control may be performed at specific locations relative to components included in the electrical subsystem 510 (e.g., batteries, sensors, actuators, computer systems, etc.). The configuration and operation of the electrical subsystem 510 is as described with respect to the electrical subsystem 410.

The liquid coolant is circulated to the cabin cooling subsystem 512 by a cabin cooling loop 522, which also includes a cooling pump 528*c*, a cooling valve 530*c*, and a cooling temperature sensor 532*c*, and is configured to allow heat exchange between the liquid coolant and the evaporator 534 to lower the temperature of the liquid coolant relative to the temperature at which the liquid coolant is received at the evaporator 534 to allow cooling of the cabin cooling subsystem 512 and/or of the liquid coolant at the coolant reservoir 516. The configuration and operation of the cabin cooling subsystem 512 is as described with respect to the cabin cooling subsystem 412.

The liquid coolant is circulated to the cabin heating subsystem 514 by a cabin heating loop 524, which also includes a heating pump 528*d*, a heating valve 530*d*, a heating temperature sensor 532*d*, a low-temperature radiator 540 and a passive electrical cooling valve 542. The cabin heating loop 524 is also configured to allow heat exchange between the liquid coolant and the condenser 536 to raise the temperature of the liquid coolant relative to the temperature at which the liquid coolant is received at the condenser 536 to allow heating of the cabin heating subsystem 514 and/or of the liquid coolant at the coolant reservoir 516. The cabin heating loop 524 is also configured to reject waste heat received at the condenser 536 to an ambient environment (i.e., air around the vehicle) by the low-temperature radiator 540 if the waste heat is not required by other subsystem in the vehicle thermal system 500. The configuration and operation of the cabin heating subsystem 514 is as described with respect to the cabin heating subsystem 414 except for details regarding the configuration and operation of the passive electrical cooling valve 542.

The passive electrical cooling valve 542 is a proportional valve that is located at an outlet side of the low-temperature radiator 540, between the low-temperature radiator 540 and the condenser 536. The passive electrical cooling valve 542 allows the liquid coolant to be directed, proportionally, to the condenser 536 or to the coolant reservoir 516. Thus, all or part of the liquid coolant that passes through the low-temperature radiator 540 may be directed to the coolant reservoir 516.

At the passive electrical cooling valve 542, the temperature of the liquid coolant has been lowered relative to its temperature at the outlet side of the condenser 536. During certain operating conditions, the low-temperature radiator 540 may be utilized to provide cooling capacity for the electrical subsystem 510 by lowering the temperature of the liquid coolant at the coolant reservoir 516.

The liquid coolant at the outlet side of the low-temperature radiator 540 can be utilized to provide additional passive cooling capacity for the electrical subsystem 510 when the temperature of the liquid coolant at the outlet side of the low-temperature radiator 540 is lower than the temperature of the liquid coolant at the coolant reservoir 516. As one example, under certain conditions, the refrigeration-cycle system that includes the evaporator 534 and the condenser 536 is not operated, such that the evaporator 534 does not provide cooling capacity to the vehicle thermal system 500 and the condenser 536 does not provide heating capacity to the vehicle thermal system 500. A portion of the liquid coolant from the coolant reservoir 516 is cycled through the condenser 536 by the heating pump 528*d*, but heat is not added to the liquid coolant because the condenser 536 is not operating.

The heating valve 530*d* passes at least a portion of the liquid coolant to the low-temperature radiator 540, which cools the liquid coolant by allowing heat to pass out of the liquid coolant to an ambient environment. Downstream of the low-temperature radiator 540, some or all of the liquid coolant that passes through the low-temperature radiator 540 is directed to the coolant reservoir 516 by the passive electrical cooling valve 542, and this portion of the liquid coolant mixes with liquid coolant received from other systems at the coolant reservoir 516 to lower the temperature of the combined liquid coolant that exits the coolant reservoir 516. A portion of this liquid coolant is then provided to other subsystems of the vehicle thermal system 500, such as the electrical subsystem 510, thereby using the cooling capacity of the cabin heating loop 524 to cool components from other subsystems of the vehicle thermal system 500.

Figure 6:
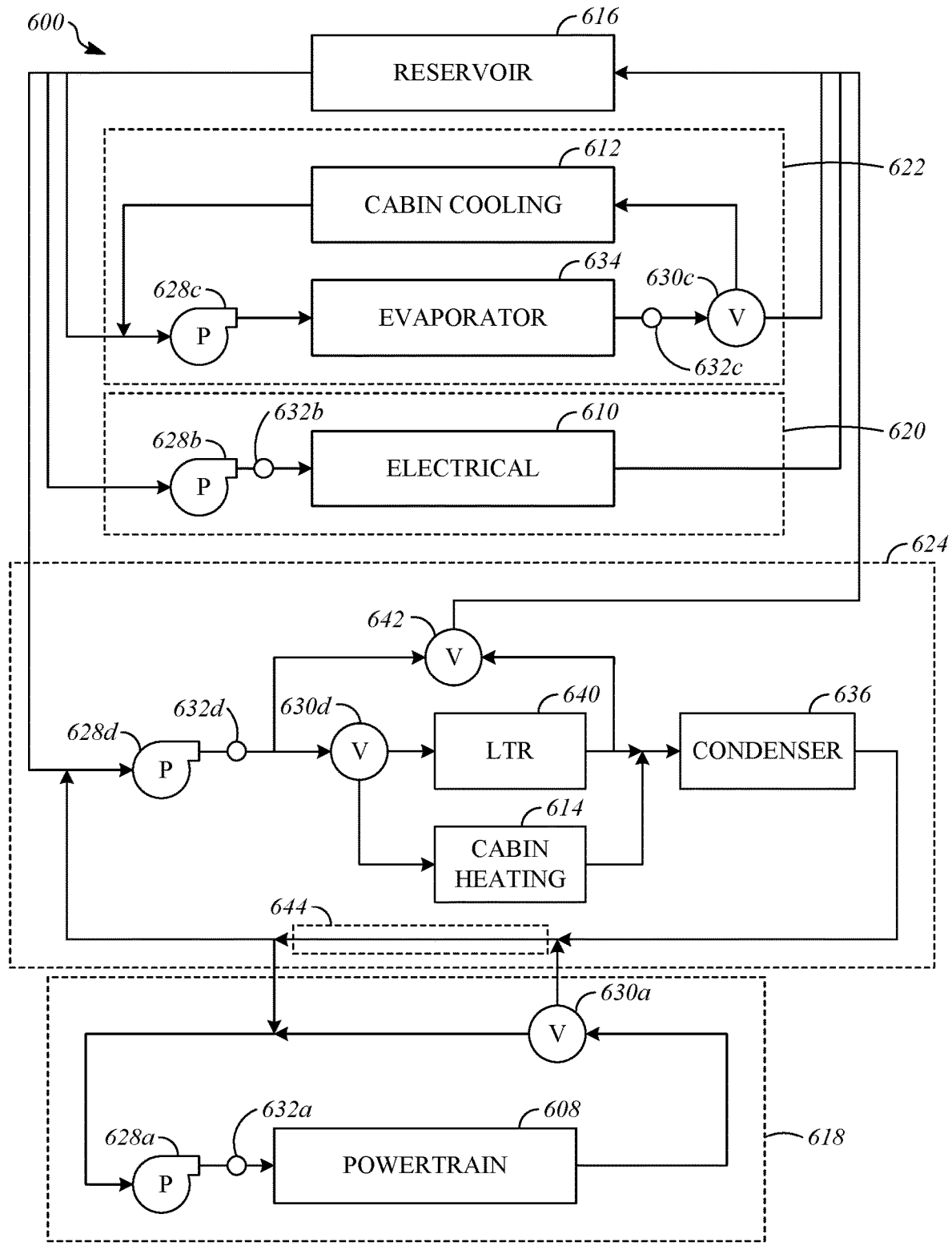
FIG. 6 is an illustration that shows components of a vehicle thermal system according to a sixth example and fluid flow connections between the components.

FIG. 6 is an illustration that shows portions of a vehicle thermal system 600 and fluid flow connections between the components. Components of the vehicle thermal system 600 may be similar to the vehicle thermal system 400, and like-named components of the vehicle thermal system 600 are identical to corresponding components from the vehicle thermal system 400. The descriptions of the corresponding components from the vehicle thermal system 300 and the vehicle thermal system 400 are equally applicable, except as otherwise described herein.

The vehicle thermal system 600 regulates temperatures for a powertrain subsystem 608, an electrical subsystem 610, a cabin cooling subsystem 612, and a cabin heating subsystem 614, each of which are supplied liquid coolant from and are able to return the liquid coolant to a coolant reservoir 616.

The liquid coolant is circulated to the powertrain subsystem 608 by a powertrain loop 618, which also includes a powertrain pump 628*a*, a powertrain valve 630*a*, and a powertrain temperature sensor 632*a*. The configuration and operation of the powertrain subsystem 608 is as described with respect to the powertrain subsystem 408 except as otherwise described herein.

The powertrain loop 618 differs from the powertrain loop 418 in that it is not directly connected to coolant reservoir 616, and does not include its own radiator, as compared to the powertrain loop 418, which includes the high-temperature radiator 438. Instead, the powertrain loop 618 is connected to a cabin heating loop 624 such that fluid from the powertrain loop 618 is able to mix with fluid from the cabin heating loop 624 within a combined-flow section 644 of the cabin heating loop 624.

The combined-flow section 644 is a fluid carrying structure (e.g., a conduit) that forms part of the cabin heating loop 624. A first fluid connection is located upstream from the combined-flow section 644 and supplies the liquid coolant from the powertrain loop 618 to the cabin heating loop 624. The amount of fluid that is supplied to the combined-flow section 644 of the cabin heating loop 624 from the powertrain loop 618 is controlled by the powertrain valve 630*a* of the powertrain loop 618. Downstream from the combined-flow section 644, a second fluid connection is able to supply the liquid coolant from the cabin heating loop 624 to the powertrain loop 618. In the illustrated example, the second fluid connection is not valve controlled, and the amount of fluid supplied to the powertrain loop 618 from the cabin heating loop 624 is a function of the flow rate of the powertrain pump 628a and position of the powertrain valve 630a.

Within the combined-flow section 644, the liquid coolant from the cabin heating loop 624 mixes with the portion of the liquid coolant that is supplied by the powertrain loop 618, such that the temperatures equalize to an intermediate temperature relative to their respective starting temperatures. Since the temperature of the liquid coolant in the cabin heating loop 624 will typically be lower than the temperature of the liquid coolant in the powertrain loop 618, the cabin heating loop 624 will therefore supply liquid coolant to the powertrain loop 618 at a temperature that is lower than that of the liquid coolant that is circulating within the powertrain loop 618 (e.g., as measured by the powertrain temperature sensor 632a), and liquid coolant from the cabin heating loop 624 therefore cools the powertrain subsystem 608. The temperature of the liquid coolant in the cabin heating loop 624 is consequently increased, as will be discussed further herein.

The liquid coolant is circulated to the electrical subsystem 610 by an electrical loop 620, which also includes an electrical pump 628b and an electrical temperature sensor 632b.

In the illustrated example, the electrical temperature sensor 632b is located between the electrical pump 628b and the electrical subsystem 610, but it may be located in other locations along the electrical loop 620. In some implementations, certain components, such the electrical temperature sensor 632b, may be internal to the electrical subsystem 610, such temperature monitoring or other types of measurement or control may be performed at specific locations relative to components included in the electrical subsystem 610 (e.g., batteries, sensors, actuators, computer systems, etc.). The configuration and operation of the electrical subsystem 610 is as described with respect to the electrical subsystem 410.

The liquid coolant is circulated to the cabin cooling subsystem 612 by a cabin cooling loop 622, which also includes a cooling pump 628c, a cooling valve 630c, and a cooling temperature sensor 632c, and is configured to allow heat exchange between the liquid coolant and the evaporator 634 to lower the temperature of the liquid coolant relative to the temperature at which the liquid coolant is received at the evaporator 634 to allow cooling of the cabin cooling subsystem 612 and/or of the liquid coolant at the coolant reservoir 616. The configuration and operation of the cabin cooling subsystem 612 is as described with respect to the cabin cooling subsystem 412.

The liquid coolant is circulated to the cabin heating subsystem 614 by the cabin heating loop 624, which also includes a heating pump 628d, a heating valve 630d, a heating temperature sensor 632d, a low-temperature radiator 640 and a heating return valve 642. The cabin heating loop 624 is also configured to allow heat exchange between the liquid coolant and the condenser 636 to raise the temperature of the liquid coolant relative to the temperature at which the liquid coolant is received at the condenser 636 to allow heating of the cabin heating subsystem 614 and/or of the liquid coolant at the coolant reservoir 616. The cabin heating loop 624 is also configured to reject waste heat received at the condenser 636 to an ambient environment (i.e., air around the vehicle) by the low-temperature radiator 640 if the waste heat is not required by other subsystem in the vehicle thermal system 600. The configuration and operation of the cabin heating subsystem 614 is as described with respect to the cabin heating subsystem 414 except as described herein.

The heating pump 628d controls the flow rate of the liquid coolant in the cabin heating loop 624. The heating temperature sensor 632d is located downstream from the heating pump 628d. Downstream from the heating temperature sensor 632d and the heating pump 628d, the cabin heating loop 624 defines a connection to the heating valve 630d and defines a first connection to the heating return valve 642. The heating valve 630d is a two-way proportional valve that splits flow of the liquid coolant between the cabin heating subsystem 614 and the low-temperature radiator 640 such that each may receive between zero and one-hundred percent of the liquid coolant that passes through the heating valve 630d. Downstream from the low-temperature radiator 640, the cabin heating loop 624 defines a second connection to the heating return valve 642, between the low-temperature radiator 640 and the condenser 636.

The heating return valve 642 is a proportional valve that receives fluid from first and second connections that are located along the cabin heating loop 624 upstream from both the cabin heating subsystem 614 and the low-temperature radiator 640 and downstream from both the cabin heating subsystem 614 and the low-temperature radiator 640. The heating return valve 642 allows the liquid coolant to be directed, proportionally, from the cabin heating loop 624 to the coolant reservoir 616. Since the temperature of the liquid coolant is higher at the first connection and lower at the second connection, the heating return valve 642 can be controlled to return desired flow rate of the liquid coolant (which may be hot or cold) to the coolant reservoir 616. Thus, for example, heating can be applied to other portions of the vehicle thermal system 600 by directing a portion of flow from the first connection, and cooling can be applied to other portions of the vehicle thermal system 600 by directing a portion of flow from the second connection. The heating return valve 642 can also close the connection to the coolant reservoir 616. If the connection to the reservoir is closed, the cabin heating loop 624 operates by recirculating the liquid coolant within the cabin heating loop 624 without receiving liquid coolant from the coolant reservoir 616 and without returning liquid coolant to the coolant reservoir 616.

The condenser 636 receives combined liquid coolant flows from the cabin heating subsystem 614 and the low-temperature radiator 640. Heat may be added to the liquid coolant by the condenser 636 under certain circumstances, such as when addition heat is needed for use by the cabin heating subsystem 614 or when the evaporator 634 is being used by the cabin cooling subsystem 612 for cabin cooling (which causes heat generation by the condenser 636 according to the refrigeration-cycle). Fluid passes from the condenser 636 to the combined-flow section 644 before returning to the heating pump 628d.

Figure 7:
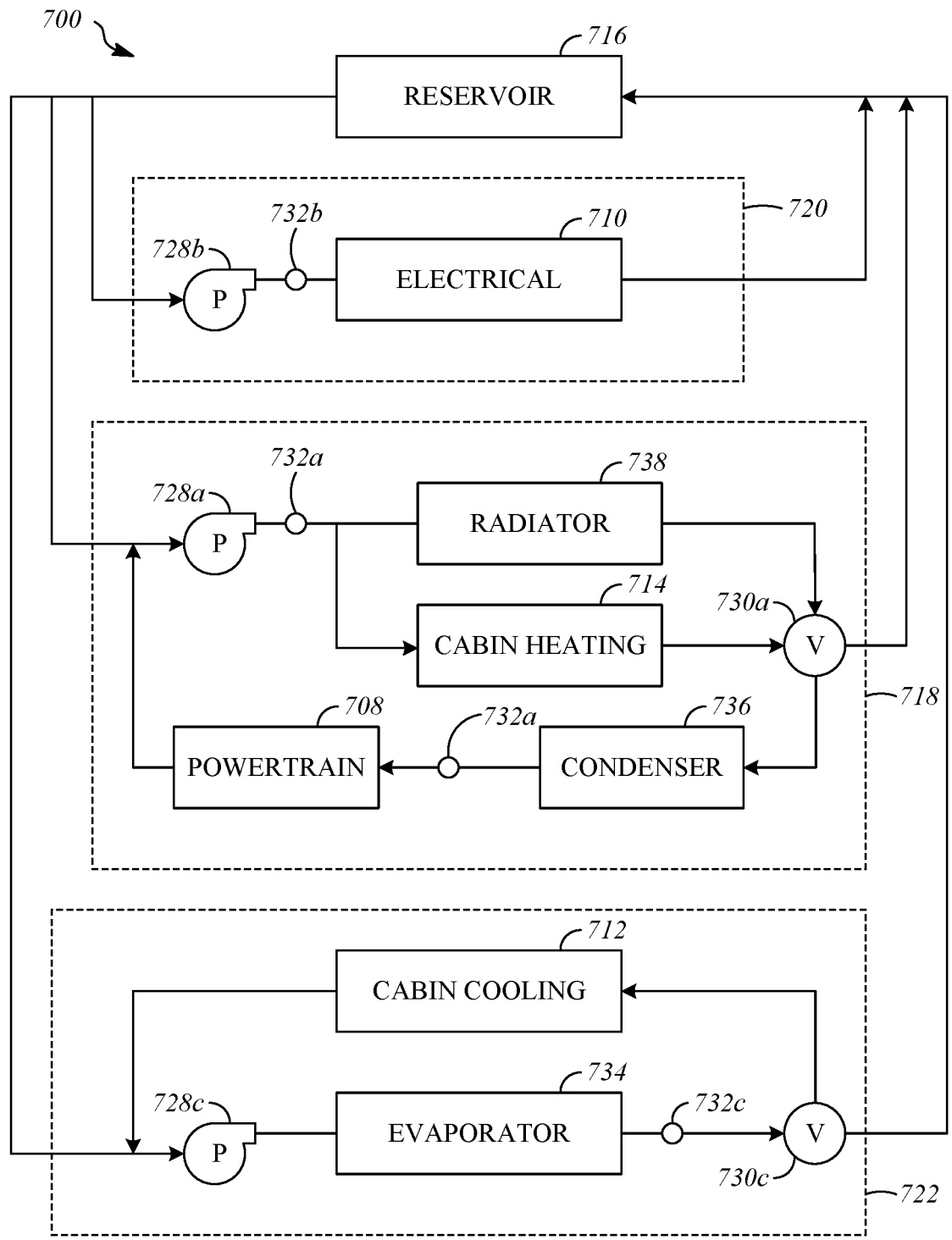
FIG. 7 is an illustration that shows components of a vehicle thermal system according to a seventh example and fluid flow connections between the components.

FIG. 7 is an illustration that shows components of a vehicle thermal system 700 and fluid flow connections between the components. Components of the vehicle thermal system 700 may be similar to the vehicle thermal system 500, and like-named components of the vehicle thermal system 700 are identical to corresponding components from the vehicle thermal system 500. The descriptions of the corresponding components from the vehicle thermal system 300, the vehicle thermal system 400, and the vehicle thermal system 500 are equally applicable, except as otherwise described herein.

The vehicle thermal system 700 regulates temperatures for a powertrain subsystem 708, an electrical subsystem 710, a cabin cooling subsystem 712, and a cabin heating subsystem 714, each of which are supplied liquid coolant from and are able to return the liquid coolant to a coolant reservoir 716.

The liquid coolant is circulated to the powertrain subsystem 708 and the cabin heating subsystem 714 by a powertrain and cabin heating loop 718. The powertrain and cabin heating loop 718 also includes a powertrain pump 728*a*, a powertrain and cabin heating valve 730*a*, powertrain and cabin heating temperature sensors 732*a*, a condenser 736, and a radiator 738.

The liquid coolant is supplied to the powertrain and cabin heating loop 718 from the coolant reservoir 716 and received at the powertrain pump 728*a*. The powertrain pump 728*a* also receives liquid coolant that is recirculated within the powertrain and cabin heating loop 718. One of the powertrain and cabin heating temperature sensors 732*a* is downstream from the powertrain pump 728*a*, along a fluid flow path that supplies the liquid coolant to the cabin heating subsystem 714 and the radiator 738, each of which may absorb heat from the liquid coolant. The liquid coolant passes from the cabin heating subsystem 714 and the radiator 738 to the powertrain and cabin heating valve 730*a*, which is a proportional valve that is controlled to return some or all of the liquid coolant to the coolant reservoir 716 and to recirculate some or all of the liquid coolant.

The powertrain and cabin heating valve 730*a* has two inlets, a first inlet that receives the liquid coolant from the cabin heating subsystem 714 and a second inlet that receives the liquid coolant from the radiator 738. By controlling the amount of the liquid coolant received from each of the cabin heating subsystem 714 and the radiator 738, the powertrain and cabin heating valve 730*a* controls the amount of heat rejected to the environment by the radiator 738 and the amount of heat supplied to the cabin heating subsystem 714. Also, by controlling the amount of heat rejected to the environment by the radiator 738 and the amount of heat supplied to the cabin heating subsystem 714, the powertrain and cabin heating valve 730*a* controls temperatures within the powertrain and cabin heating loop 718. The powertrain and cabin heating valve 730*a* has two outlets, a first outlet that directs the liquid coolant to the coolant reservoir and a second outlet that directs the liquid coolant along a recirculation path toward the condenser 736. By controlling the amount of the liquid coolant that is returned to the coolant reservoir 716 or recirculated, the powertrain and cabin heating valve 730*a* controls temperatures within the powertrain and cabin heating loop 718 and can control an amount of heat supplied to the coolant reservoir 716.

Along the recirculation path, downstream from the powertrain and cabin heating valve 730*a*, the liquid coolant that was recirculated is supplied to the condenser 736, where heat may be absorbed by the liquid coolant. The liquid coolant then passes another one of the powertrain and cabin heating temperature sensors 732*a*, which is located along a flow path between the condenser 736 and the powertrain subsystem 708. The liquid coolant may absorb heat from the powertrain subsystem before joining the liquid coolant supplied from the coolant reservoir upstream from the powertrain pump 728*a*.

As an example, the powertrain and cabin heating valve 730*a* may have six operating modes. In a first operating mode, flow is directed from the radiator 738 to the coolant reservoir 716. In a second operating mode, flow is directed from the radiator 738 to the coolant reservoir 716 and the condenser 736, by proportionally controlling distribution of the liquid coolant between the coolant reservoir 716 and the condenser 736. In a third operating mode, flow is directed from the radiator 738 to the condenser 736. In a fourth operating mode, flow is directed from the cabin heating subsystem 714 to the condenser 736. In a fifth operating mode, flow is directed from the cabin heating subsystem 714 and the radiator 738 to the condenser 736, by proportionally controlling distribution of the liquid coolant between the cabin heating subsystem 714 and the radiator 738. In a sixth operating mode, flow is directed from the cabin heating subsystem 714 to the condenser 736 and the coolant reservoir 716, by proportionally controlling distribution of the liquid coolant between the coolant reservoir 716 and the condenser 736.

The liquid coolant is circulated to the electrical subsystem 710 by an electrical loop 720, which also includes an electrical pump 728*b* and an electrical temperature sensor 732*b*. In the illustrated example, the electrical temperature sensor 732*b* is located between the electrical pump 728*b* and the electrical subsystem 710, but it may be located in other locations along the electrical loop 720. In some implementations, certain components, such the electrical temperature sensor 732*b*, may be internal to the electrical subsystem 710, such temperature monitoring or other types of measurement or control may be performed at specific locations relative to components included in the electrical subsystem 710 (e.g., batteries, sensors, actuators, computer systems, etc.). The configuration and operation of the electrical subsystem 710 is as described with respect to the electrical subsystem 410.

The liquid coolant is circulated to the cabin cooling subsystem 712 by a cabin cooling loop 722, which also includes a cooling pump 728*c*, a cooling valve 730*c*, and a cooling temperature sensor 732*c*, and is configured to allow heat exchange between the liquid coolant and the evaporator 734 to lower the temperature of the liquid coolant relative to the temperature at which the liquid coolant is received at the evaporator 734 to allow cooling of the cabin cooling subsystem 712 and/or of the liquid coolant at the coolant reservoir 716. The configuration and operation of the cabin cooling subsystem 712 is as described with respect to the cabin cooling subsystem 412.

The vehicle thermal system 700 differs from the vehicle thermal system 500 in that the powertrain subsystem 708 and the cabin heating subsystem 714 are both incorporated in the powertrain and cabin heating loop 718, instead of being included in separate loops. Thus, the vehicle thermal system 700 is controlled to maintain the powertrain subsystem 708 and the cabin heating subsystem 714 within a temperature range that is acceptable for both subsystems. In addition, the in the vehicle thermal system 700, the valve 730*a* replaces the functions that are performed by the valve 530*d* and the valve 542 in vehicle thermal system 500. Compared to the vehicle thermal system 500, the vehicle thermal system 700 has one fewer pump and two fewer valves. Operation of the vehicle thermal system 700 is otherwise as described with respect to the vehicle thermal system 500.

Figure 8:
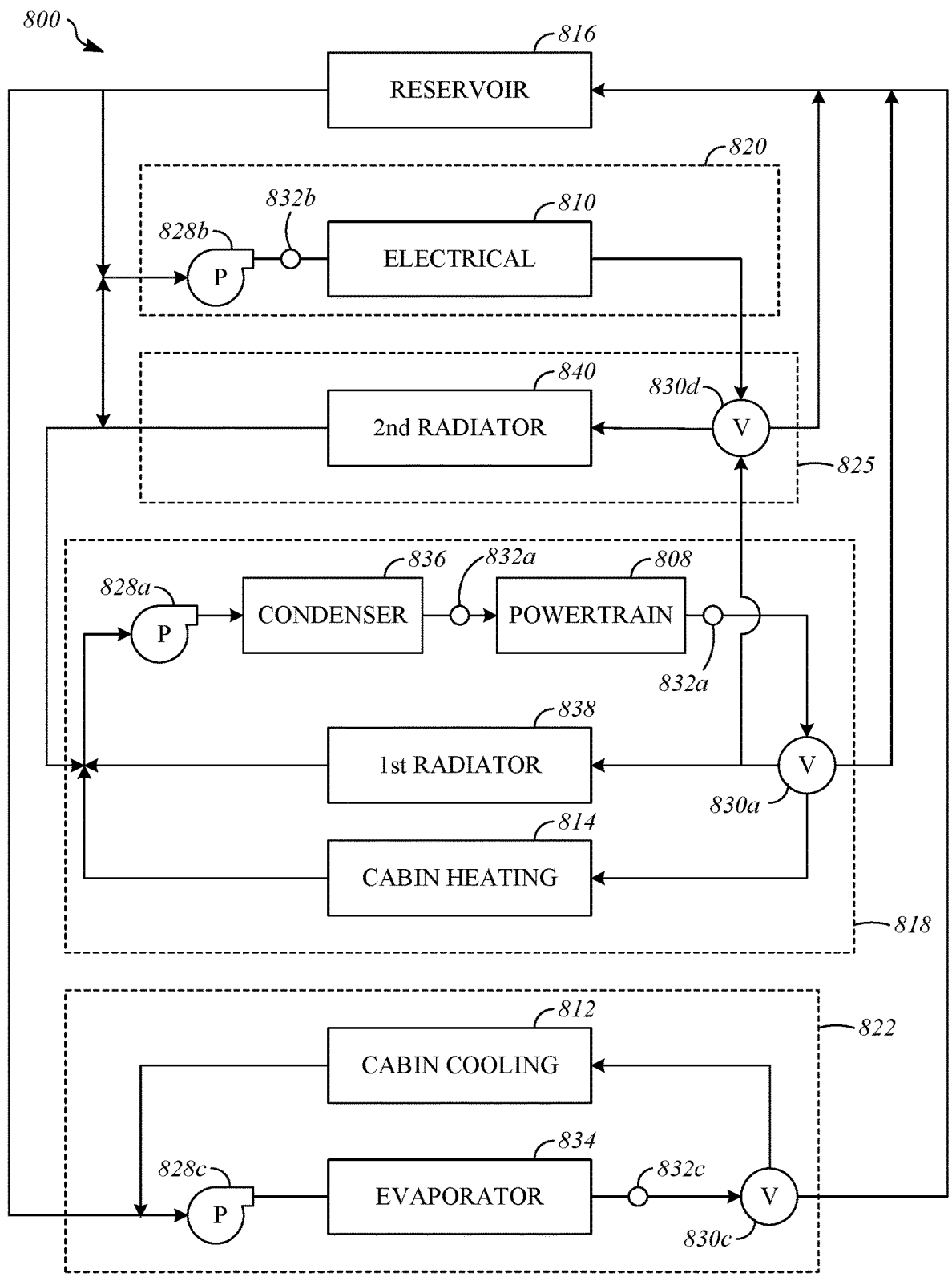
FIG. 8 is an illustration that shows components of a vehicle thermal system according to an eighth example and fluid flow connections between the components.

FIG. 8 is an illustration that shows components of a vehicle thermal system 800 and fluid flow connections between the components. Components of the vehicle thermal system 800 may be similar to the vehicle thermal system 700, and like-named components of the vehicle thermal system 800 are identical to corresponding components from the vehicle thermal system 700. The descriptions of the corresponding components from the vehicle thermal system 300, the vehicle thermal system 400, the vehicle thermal system 500, and the vehicle thermal system 700 are equally applicable, except as otherwise described herein.

The vehicle thermal system 800 regulates temperatures for a powertrain subsystem 808, an electrical subsystem 810, a cabin cooling subsystem 812, and a cabin heating subsystem 814, each of which are supplied liquid coolant from and are able to return the liquid coolant to a coolant reservoir 816. The vehicle thermal system 800 also has a shared radiator section 825.

The liquid coolant is circulated to the powertrain subsystem 808 and the cabin heating subsystem 814 by a powertrain and cabin heating loop 818. The powertrain and cabin heating loop 818 also includes a powertrain and cabin heating pump 828*a*, a powertrain and cabin heating valve 830*a*, powertrain and cabin heating temperature sensors 832*a*, a condenser 836, and a first radiator 838.

The liquid coolant is supplied to the powertrain and cabin heating loop 818 from the coolant reservoir 816 and/or the shared radiator section 825 and is received at the powertrain and cabin heating pump 828*a*. The powertrain and cabin heating pump 828*a* also receives liquid coolant that is recirculated within the powertrain and cabin heating loop 818 from the cabin heating subsystem 814 and the first radiator 838. The liquid coolant passes from the powertrain and cabin heating pump 828*a* to the condenser 836, and the liquid coolant may absorb heat from the condenser 836. One of the powertrain and cabin heating temperature sensors 832*a* is downstream from the condenser 836, along a fluid flow path that supplies the liquid coolant to the powertrain subsystem 808. Another one of the powertrain temperature sensors is downstream from the powertrain subsystem 808. The liquid coolant passes from the powertrain subsystem 808 to the powertrain and cabin heating valve 830*a*, which is a proportional valve that is controlled to return some or all of the liquid coolant to the coolant reservoir 816 and to recirculate some or all of the liquid coolant.

The powertrain and cabin heating valve 830*a* has one inlet that receives the liquid coolant from the powertrain subsystem 808. The powertrain and cabin heating valve 830*a* has three outlets that can be controlled proportionally to split flow of the liquid coolant between the coolant reservoir 816, the cabin heating subsystem 814, and the first radiator 838. By controlling the amount of the liquid coolant supplied to each of the cabin heating subsystem 814 and the first radiator 838, the powertrain and cabin heating valve 830*a* controls the amount of heat rejected to the environment by the first radiator 838 and the amount of heat supplied to the cabin heating subsystem 814, and further control may be exercised by directing some or all of the liquid coolant to the coolant reservoir 816.

Downstream from the powertrain and cabin heating valve 830*a*, along a flow path that leads to the first radiator 838, a branch can connect the powertrain and cabin heating loop 818 to the shared radiator section 825, as will be explained further herein.

Along a recirculation path, downstream from the powertrain and cabin heating valve 830*a*, the liquid coolant that was recirculated is supplied to the cabin heating subsystem 814 and/or to the first radiator 838, according to the operating mode of the powertrain and cabin heating valve 830*a*. After passing through the cabin heating subsystem 814 and/or to the first radiator 838, the recirculated portion of the liquid coolant joins the liquid coolant supplied from the coolant reservoir 816 and/or the shared radiator section 825 and proceeds to the powertrain and cabin heating pump 828*a*.

The liquid coolant is circulated to the electrical subsystem 810 by an electrical loop 820, which also includes an electrical pump 828*b* and an electrical temperature sensor 832*b*. In the illustrated example, the electrical temperature sensor 832*b* is located between the electrical pump 828*b* and the electrical subsystem 810, but it may be located in other locations along the electrical loop 820. In some implementations, certain components, such the electrical temperature sensor 832*b*, may be internal to the electrical subsystem 810, such temperature monitoring or other types of measurement or control may be performed at specific locations relative to components included in the electrical subsystem 810 (e.g., batteries, sensors, actuators, computer systems, etc.). The outlet of the electrical loop 820 is not directly connected to the coolant reservoir 816 but is instead connected to the shared radiator section 825, as will be explained herein. The configuration and operation of the electrical subsystem 810 is otherwise as described with respect to the electrical subsystem 410.

The liquid coolant is circulated to the cabin cooling subsystem 812 by a cabin cooling loop 822, which also includes a cooling pump 828*c*, a cooling valve 830*c*, and a cooling temperature sensor 832*c*, and is configured to allow heat exchange between the liquid coolant and the evaporator 834 to lower the temperature of the liquid coolant relative to the temperature at which the liquid coolant is received at the evaporator 834 to allow cooling of the cabin cooling subsystem 812 and/or of the liquid coolant at the coolant reservoir 816. The configuration and operation of the cabin cooling subsystem 812 is as described with respect to the cabin cooling subsystem 412.

The shared radiator section 825 includes a radiator valve 830*d* and a second radiator 840. The shared radiator section 825 receives the liquid coolant from the powertrain and cabin heating loop 818 and from the electrical loop 820 at the radiator valve 830*d*. The shared radiator section 825 may return some or all of the liquid coolant to the coolant reservoir 816 and may supply some or all of the liquid coolant to the powertrain and cabin heating loop 818 and the electrical loop 820.

The radiator valve 830*d* has two inlets and two outlets. A first inlet of the radiator valve 830*d* is configured to receive the liquid coolant from the electrical loop 820. A second inlet of the radiator valve 830*d* is configured to receive the liquid coolant from the powertrain and cabin heating loop 818. A first outlet of the radiator valve 830*d* is configured to return the liquid coolant to the coolant reservoir 816. A second outlet of the radiator valve 830*d* is configured to direct the liquid coolant to the second radiator 840, where heat is rejected from the liquid coolant to reduce the temperature of the liquid coolant before directing the liquid coolant to the inlet sides of the powertrain and cabin heating loop 818 and the electrical loop 820.

In a first operating mode, the liquid coolant from the electrical loop 820 is directed through the second radiator 840 and/or to the coolant reservoir 816 under proportional control by the radiator valve 830*d*, while blocking flow of fluid from the powertrain and cabin heating loop 818 to control heat rejection and temperature for the electrical loop 820. In a second operating mode, the radiator valve 830*d* directs the liquid coolant from the electrical loop 820 to the coolant reservoir 816 and directs the liquid coolant from the powertrain and cabin heating loop 818 to the second radiator 840, such that all of the liquid coolant from the electrical loop 820 is supplied to the coolant reservoir 816 and all of the liquid coolant from the powertrain and cabin heating loop 818 is supplied to the second radiator 840. In this operating mode, the powertrain and cabin heating loop 818 is rejecting heat to the environment using the first radiator 838 and the second radiator 840 in parallel.

The vehicle thermal system 800 differs primarily from the vehicle thermal system 700 by incorporation of the shared radiator section 825 that allows the electrical subsystem 810 to reject heat directly to the environment and it also allows the first radiator 838 to operate in parallel with the second radiator 840 when the second radiator 840 is not used by the electrical subsystem 810. Operation of the vehicle thermal system 800 is otherwise as described with respect to the vehicle thermal system 700.

Figure 9:
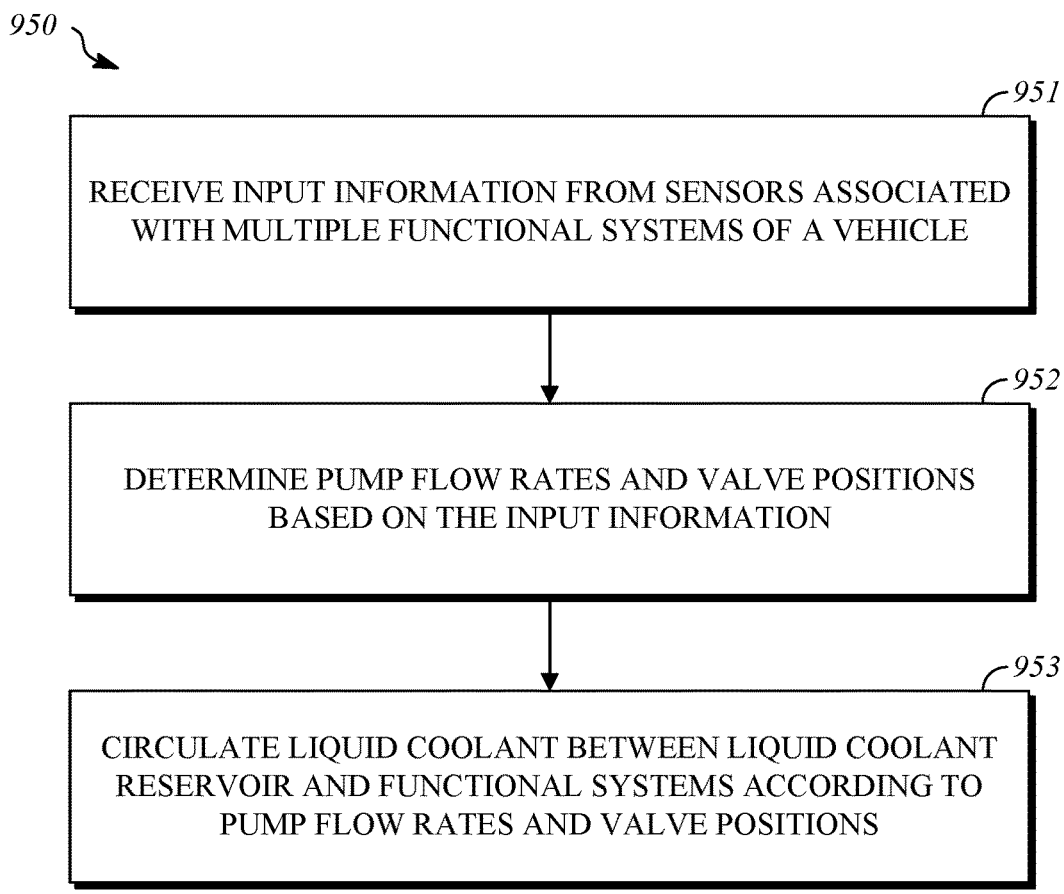
FIG. 9 is a flowchart that shows a process for operating a vehicle thermal system.

FIG. 9 is a flowchart that shows a process 950 for operating a vehicle thermal system. The process 950 can be performed, for example, using the vehicle thermal system 300, the vehicle thermal system 400, the vehicle thermal system 500, the vehicle thermal system 600, the vehicle thermal system 700, or the vehicle thermal system 800, under direction from a controller, such as the controller 326 of the vehicle thermal system 300.

In operation 951, input information is received from sensors associated with multiple functional systems of a vehicle. The input information describes operating conditions of the vehicle thermal system and its respective functional systems. Examples of functional systems are previously given with respect to the vehicle thermal system 100, the vehicle thermal system 200, vehicle thermal system 300, the vehicle thermal system 400, the vehicle thermal system 500, the vehicle thermal system 600, the vehicle thermal system 700, and the vehicle thermal system 800, and those and other functional systems can be among the systems from which input information is received in operation 951. The input information can be received by a controller, such as the controller 326 of the vehicle thermal system 300. As examples, the input information that is received from each of the functional subsystems can include temperature measurements, actual pump speeds, valve positions, and requests from the functional subsystems.

In operation 952, pump flow rates and valve positions are determined for circulation of coolant between the functional systems and a liquid coolant reservoir, where the liquid coolant is received from the functional subsystems and mixes to achieve an equilibrium temperature and a common reference pressure, as functions of temperature and flow rate of the liquid coolant that is returned to the liquid coolant reservoir from the functional systems. The flow rates and valve positions are determined for pumps and valves associated with each of the functional systems based on input information from operation 951.

In operation 953 the liquid coolant is circulated between the functional systems and the liquid coolant reservoir according to the valve positions and the flow rates determined in operation 952.

Figure 10:
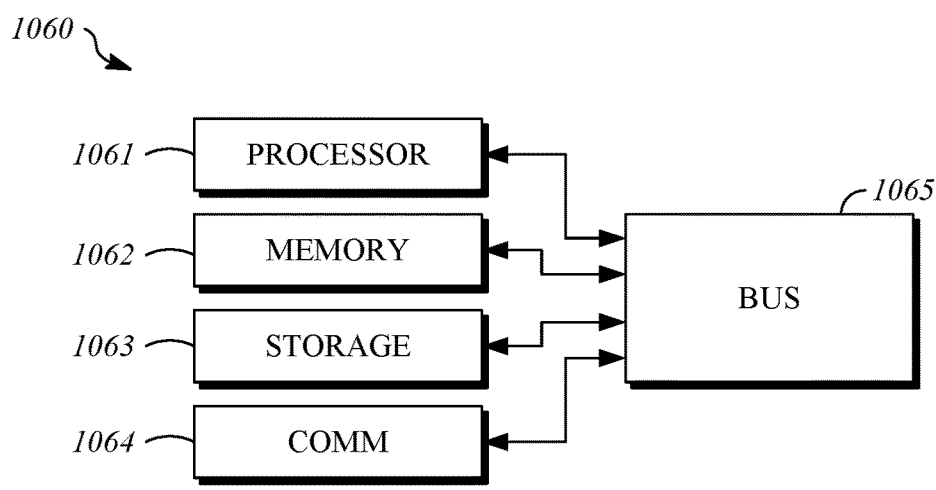
FIG. 10 is an illustration that shows an example of a computing device.

FIG. 10 is an illustration that shows an example of a computing device 1060 that can be utilized to regulate operation of the vehicle thermal system 300, the vehicle thermal system 400, the vehicle thermal system 500, the vehicle thermal system 600, the vehicle thermal system 700, or the vehicle thermal system 800. For example, the computing device 1060 can be used as the controller 326 of the vehicle thermal system 300.

The computing device 1060 includes a processor 1061, a memory device 1062, a storage device 1063, a communications interface 1064, and a bus 1065. The processor 1061 is a conventional processing device that is operable to receive inputs, execute instructions, and generate outputs. The memory device 1062 is operable to store information for immediate access by the processor 1061, and may be volatile information storage medium, such as a random-access memory device. The storage device 1063 is a non-volatile information storage medium such as flash memory, a hard-disk drive, or a solid-state drive. The communications interface 1064 is operable to receive information from external sources and to send information to external sources, such as by receiving signals that represent sensor outputs and by transmitting signals that represent commands. The bus 1065 is a conventional system bus of any type that interconnects the various components of the computing device 1060. Other conventional components may be included in the computing device 1060.

As used in the claims, phrases in the form of "at least one of A, B, or C" should be interpreted to encompass only A, or only B, or only C, or any combination of A, B and C.

As described above, one aspect of the present technology is the gathering and use of data available from various sources to regulate a thermal system so that users will be comfortable in the passenger cabin of a vehicle. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to create a profile that describes a user's thermal comfort under various circumstances. Further, other uses for personal information data that benefit the user are also contemplated by the present disclosure. For instance, health and fitness data may be used to provide insights into a user's thermal comfort preferences.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of thermal system regulation, the present technology can be configured to allow users to select to "opt in" or "opt out" of participation in the collection of personal information data during registration for services or anytime thereafter. In another example, users can select not to personal information for thermal system regulation. In yet another example, users can select to limit the length of time personal information in a thermal comfort profile is maintained or entirely prohibit the development of a thermal comfort profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, thermal comfort preferences based on non-personal information data or a bare minimum amount of personal information.

What is claimed is:

1. A vehicle thermal system, comprising:
a heat-generating component;
a heat-absorbing component;
a liquid coolant reservoir that receives and distributes a liquid coolant;
a first liquid loop that is connected to the liquid coolant reservoir and includes a first pump that is upstream from a first functional component to circulate the liquid coolant to the first functional component, wherein the first liquid loop is heated by the heat-generating component, and includes a first valve downstream from the first functional component to control recirculation of the liquid coolant or return of the liquid coolant to the liquid coolant reservoir; and
a second liquid loop that is connected to the liquid coolant reservoir and includes a second pump that is upstream from a second functional component to circulate the liquid coolant to the second functional component, wherein the second liquid loop is cooled by the heat-absorbing component, and includes a second valve downstream from the second functional component to control recirculation of the liquid coolant or return of the liquid coolant to the liquid coolant reservoir.

2. The vehicle thermal system of claim 1, wherein the heat-generating component and the heat-absorbing component are portions of a refrigeration-cycle thermal system.

3. The vehicle thermal system of claim 2, wherein the heat-generating component is a liquid-cooled condenser.

4. The vehicle thermal system of claim 2, wherein the heat-generating component is a liquid-cooled gas cooler.

5. The vehicle thermal system of claim 2, wherein the heat-absorbing component is a liquid-heated evaporator.

6. The vehicle thermal system of claim 1, wherein the first valve and the second valve are proportional valves.

7. The vehicle thermal system of claim 1, further comprising:
a temperature sensor that measures temperature downstream of the reservoir.

8. The vehicle thermal system of claim 1, wherein the first liquid loop and the second liquid loop each include a temperature sensor that measures a temperature of the liquid coolant.

9. The vehicle thermal system of claim 1, further comprising:
a controller that regulates temperature and flow rates for each of the first liquid loop and the second liquid loop.

10. The vehicle thermal system of claim 1, wherein first liquid loop includes a radiator.

11. The vehicle thermal system of claim 10, wherein the first liquid loop includes a first connection to return the liquid coolant to the liquid coolant reservoir and a second connection to return the liquid coolant to the liquid coolant reservoir, wherein the first connection is upstream from the radiator and the second connection is downstream from the radiator.

12. The vehicle thermal system of claim 1, wherein the first liquid loop is connected to a third liquid loop that circulates the liquid coolant to a third functional component by a combined-flow section that mixes the liquid coolant from the first liquid loop with a portion of the liquid coolant from the third liquid loop.

13. The vehicle thermal system of claim 1, further comprising:
a controller,
wherein the heat-generating component and the heat-absorbing component are portions of a refrigeration-cycle thermal system,
wherein the heat-generating component includes at least one of a liquid-cooled condenser or a liquid-cooled gas cooler,
wherein the heat-absorbing component is an evaporator,
wherein the first liquid loop and the second liquid loop each include a valve to return a first portion of the liquid coolant to the liquid coolant reservoir and to recirculate a second portion of the liquid coolant,
wherein the first liquid loop and the second liquid loop each include a temperature sensor that measures temperatures of the liquid coolant in the first liquid loop and the second liquid loop, and the controller is operable to adjust operation of the first liquid loop and the second liquid loop based on the temperatures,
wherein the first liquid loop and the second liquid loop each include a pump that controls flow of liquid coolant based on commands from the controller, and
wherein the first liquid loop includes a radiator.

14. A vehicle thermal system, comprising:
a refrigeration-cycle thermal system that includes a heat-generating component and a heat-absorbing component;
a liquid coolant reservoir that receives and distributes a liquid coolant;
a controller that controls distribution of the liquid coolant;
a cabin heating loop that is connected to the liquid coolant reservoir, is heated by the heat-generating component of the refrigeration-cycle thermal system, and circulates the liquid coolant to a cabin heating subsystem, wherein the cabin heating loop includes:
 a cabin heating pump to control flow of the liquid coolant in response to commands from the controller;
 a cabin heating valve to control return of the liquid coolant to the liquid coolant reservoir in response to commands from the controller; and
 a cabin heating temperature sensor; and
a cabin cooling loop that is connected to the liquid coolant reservoir, is cooled by the heat-absorbing component of the refrigeration-cycle thermal system, and circulates the liquid coolant to a cabin cooling subsystem, wherein the cabin cooling loop includes:
 a cabin cooling pump to control flow of the liquid coolant in response to commands from the controller;
 a cabin cooling valve to control return of the liquid coolant to the liquid coolant reservoir in response to commands from the controller; and
 a cabin cooling temperature sensor.

15. The vehicle thermal system of claim 14, wherein the cabin heating loop includes a first radiator to release excess heat to an ambient environment.

16. The vehicle thermal system of claim 15, further comprising:
a powertrain loop that is connected to the liquid coolant reservoir and circulates the liquid coolant to a powertrain subsystem, wherein the powertrain loop includes a powertrain pump to control flow of the liquid coolant in response to commands from the controller, a powertrain valve to control return of the liquid coolant to the liquid coolant reservoir in response to commands from the controller, and a powertrain temperature sensor.

17. The vehicle thermal system of claim 16, further comprising:
an electrical loop that is connected to the liquid coolant reservoir and circulates the liquid coolant to an electrical subsystem, wherein the electrical loop includes an electrical pump to control flow of the liquid coolant in response to commands from the controller, and an electrical temperature sensor.

18. The vehicle thermal system of claim 17, wherein the controller regulates operation of the cabin heating loop, the cabin cooling loop, the powertrain loop, and the electrical loop using input information received from sensors associated with the cabin heating loop, the cabin cooling loop, the powertrain loop, and the electrical loop.

19. A vehicle thermal system, comprising:
a cabin heating loop that circulates a liquid coolant to a cabin heating subsystem and is heated by a heat-generating component of a refrigeration-cycle thermal system;
a powertrain loop that circulates the liquid coolant to a powertrain subsystem;
a combined-flow section that mixes the liquid coolant from the cabin heating loop with a portion of the liquid coolant from the powertrain loop; and
a valve that controls flow of the liquid coolant between the powertrain loop and the cabin heating loop.

20. The vehicle thermal system of claim 19, wherein the cabin heating loop includes a radiator to release excess heat to an ambient environment.

21. The vehicle thermal system of claim 20, wherein the powertrain loop does not include a radiator that releases excess heat to the ambient environment.

22. A vehicle thermal system, comprising:
a refrigeration-cycle thermal system that includes a heat-generating component and a heat-absorbing component;
a liquid coolant reservoir that receives and distributes a liquid coolant;
a controller that controls distribution of the liquid coolant;
a powertrain and cabin heating loop that is connected to the liquid coolant reservoir, includes a heat-generating component of the refrigeration-cycle thermal system, a powertrain subsystem, a cabin heating subsystem, a first radiator, and a powertrain and cabin heating valve to proportionally control flow of the liquid coolant between the cabin heating subsystem and the first radiator in response to commands from the controller; and
a cabin cooling loop that is connected to the liquid coolant reservoir, is cooled by the heat-absorbing component of the refrigeration-cycle thermal system, and circulates the liquid coolant to a cabin cooling subsystem, wherein the cabin cooling loop includes a cabin cooling pump to control flow of the liquid coolant in response to commands from the controller, a cabin cooling valve to control return of the liquid coolant to the liquid coolant reservoir in response to commands from the controller, and a cabin cooling temperature sensor.

23. The vehicle thermal system of claim 22, wherein the powertrain and heating valve is further configured to proportionally control flow of the liquid coolant between return to the reservoir and a recirculation path that includes the heat-generating component and the powertrain subsystem in response to commands from the controller.

24. The vehicle thermal system of claim 22, further comprising:
an electrical loop that is connected to the liquid coolant reservoir and circulates the liquid coolant to an electrical subsystem; and
a shared radiator section that includes a second radiator and a radiator valve, wherein the radiator valve is connected to the powertrain and cabin heating loop and the electrical loop to control flow of the liquid coolant to the second radiator from the powertrain and cabin heating loop and the electrical loop in response to commands from the controller.

* * * * *

UNITED STATES PATENT AND TRADEMARK OFFICE
CERTIFICATE OF CORRECTION

PATENT NO. : 11,338,647 B1
APPLICATION NO. : 16/523582
DATED : May 24, 2022
INVENTOR(S) : Vincent G. Johnston et al.

It is certified that error appears in the above-identified patent and that said Letters Patent is hereby corrected as shown below:

In the Claims

At Column 24, Claim 10, Line 35, "wherein first" should be --wherein the first--.

Signed and Sealed this
Nineteenth Day of July, 2022

*Katherine Kelly Vidal*

Katherine Kelly Vidal
*Director of the United States Patent and Trademark Office*